(12) United States Patent
Sugimoto et al.

(10) Patent No.: US 9,336,153 B2
(45) Date of Patent: May 10, 2016

(54) COMPUTER SYSTEM, CACHE MANAGEMENT METHOD, AND COMPUTER

(71) Applicant: HITACHI, LTD., Tokyo (JP)

(72) Inventors: Ken Sugimoto, Tokyo (JP); Yuusuke Fukumura, Tokyo (JP); Nobukazu Kondo, Tokyo (JP)

(73) Assignee: HITACHI, LTD., Tokyo (JP)

( * ) Notice: Subject to any disclaimer, the term of this patent is extended or adjusted under 35 U.S.C. 154(b) by 111 days.

(21) Appl. No.: 14/338,366

(22) Filed: Jul. 23, 2014

(65) Prior Publication Data

US 2015/0032965 A1     Jan. 29, 2015

(30) Foreign Application Priority Data

Jul. 26, 2013   (JP) ................................ 2013-155547

(51) Int. Cl.
G06F 12/00     (2006.01)
G06F 12/08     (2016.01)

(52) U.S. Cl.
CPC ...... G06F 12/0868 (2013.01); *G06F 2212/222* (2013.01)

(58) Field of Classification Search
None
See application file for complete search history.

(56) References Cited

U.S. PATENT DOCUMENTS

| 5,937,433 A | 8/1999 | Lee et al. |
|---|---|---|
| 6,219,750 B1 | 4/2001 | Kanamaru et al. |
| 2012/0117332 A1* | 5/2012 | Ish .................... G06F 9/3004 711/145 |

FOREIGN PATENT DOCUMENTS

JP     2012-078939 A     4/2012

* cited by examiner

*Primary Examiner* — Adam M Queler
*Assistant Examiner* — Jason Blust
(74) *Attorney, Agent, or Firm* — Mattingly & Malur, PC

(57) ABSTRACT

A computer system, comprising a server on which an application runs, and a storage system that stores data to be used by the application, the cache driver being configured to change, in a case of the condition of a cache area is a first cache condition in which data is readable from a cache area and writing of data into the cache area is prohibited, the condition of the cache area to a third cache condition in which reading of data from the cache area is prohibited and writing of data into the cache area is prohibited, from the first cache condition.

15 Claims, 14 Drawing Sheets

CACHE MANAGEMENT TABLE

| CACHE MEMORY ADDRESS | SHARED STORAGE SYSTEM ADDRESS | DATA VALID BIT | WRITE VALID BIT |
|---|---|---|---|
| 0x1000 | 0x2000 | 1 | 0 |
| 0x2000 | - | 0 | 1 |
| 0x3000 | - | 0 | 0 |
| 0x4000 | - | 0 | 0 |
| 0x5000 | - | 0 | 1 |
| 0x6000 | 0x5000 | 1 | 0 |
| ... | | | |

*FIG. 3*

CACHE QUEUE CONDITION TABLE

| CACHE QUEUE NO. | EXECUTION WAITING QUEUE BIT |
|---|---|
| 1 | 1 |
| 2 | 0 |
| 3 | 1 |
| ... | |

*FIG. 4*

QUEUE TRANSLATION TABLE

| APPLICATION QUEUE NO. | CACHE QUEUE NO. | STORAGE QUEUE NO. |
|---|---|---|
| 1 | 1 | 1 |
| 2 | 3 | 2 |
| 3 | 4 | 5 |
| ... | | |

EXECUTION QUEUE

| ENTRY NO. | COMMAND | DESTINATION ADDRESS | DATA | I/O REQUEST VALID BIT |
|---|---|---|---|---|
| 1 | - | - | - | 0 |
| 2 | Read | 0x1000 | - | 1 |
| 3 | Write | 0x6000 | 0x1234 | 1 |
| 4 | - | - | - | 0 |
| ... | | | | |

*FIG. 7*

COMPLETION QUEUE

| EXECUTION QUEUE ENTRY NO. | COMPLETION BIT |
|---|---|
| 3 | 1 |
| 2 | 1 |
| ... | |

*FIG. 8*

COMPUTER SYSTEM, CACHE MANAGEMENT METHOD, AND COMPUTER

CLAIM OF PRIORITY

The present application claims priority from Japanese patent application JP 2013-155547 filed on Jul. 26, 2013, the content of which is hereby incorporated by reference into this application.

BACKGROUND OF THE INVENTION

This invention relates to cache control in an I/O process using cache areas provided in a server and a storage system.

In recent years, applications of non-volatile memories, such as a flash memory, to a server and a shared storage have been in progress. Along with such tendency, Storage Networking Industry Association (SNIA), which is an industry group that aims at developing storage networking, has proposed an I/O stack for non-volatile memories called non-volatile memory express (NVMe), which uses a PCI Express (hereinafter "PCIe") interface designed by the PCI-SIG.

The NVMe is an I/O stack that reduces the load of a CPU on an I/O process in order to utilize the high-speed performance of a non-volatile memory as compared to an existing I/O stack. The use of the NVMe can therefore increase the speed of applications whose bottleneck is the load of a CPU. It is assumed that the application, the non-volatile memory mounted in a server, and the storage system are compliant with NVMe in future, leading to utilization of the NVMe.

In recent years, it has become popular to use a non-volatile memory mounted in a server as a cache for a shared storage system. See, for example, JP 2012-78939 A.

JP 2012-78939 A discloses the configuration that uses a flash memory as a cache for an HDD. According to this configuration, an existing I/O stack is used between an application and the non-volatile memory in the server as well as between the application and the storage.

In view of the above, it is conceivable that a system handling an NVMe-compliant non-volatile memory as a cache is necessary for a system having an NVMe-compliant application and an NVMe-compliant storage system in future. In other words, it is conceivable that a system in which an I/O stack between an application and a non-volatile memory and an I/O stack between an application and a storage are both compliant with NVMe emerge in future.

SUMMARY OF THE INVENTION

According to the NVMe, an I/O process is performed in two separate processes including registration of an I/O request in a queue and execution of the I/O request registered in the queue. The two processes are performed in response to an instruction from an application.

In a case where an application instructs registration of a read request in a queue, for example, the NVMe registers the read request in the queue. A read process on a device has not been performed yet at this stage. In a case where an instruction to execute the read request registered in the queue is received from the application thereafter, the NVMe performs the read process on the device.

An NVMe-compliant device has a plurality of queues and can perform a plurality of I/O processes in parallel using the plurality of queues.

There is such a problem that, in a case where I/O requests for the same address are registered in a plurality of queues in a system using an NVMe-compliant non-volatile memory as a cache, garbled data may occur depending on the order of execution of the I/O requests. The occurrence of data corruption is described below by way of a specific example.

In this example, it is assumed that a single application is performing an I/O process using a first queue and a second queue. It is also assumed that target data of an I/O request is located in a cache area corresponding to an address "0x1000" in a non-volatile memory.

First, the application registers a read request in the first queue. A read process has not been performed yet at this stage. In a case where the read request is executed, data is read out from the cache area corresponding to the address "0x1000" in the non-volatile memory.

Next, the application registers a write request in the second queue. It is assumed then that data to be written is to be registered at the address "0x1000" in the server non-volatile memory as a cache.

It is assumed at this time that the application instructs execution of the write request registered in the second queue, and then instructs execution of the read request registered in the first queue.

As a result, new data is stored in the cache area corresponding to the address "0x1000", and the new data is read out. Accordingly, while data before update needs to be read out, updated data is read out. In other words, garbled data occurs as a result.

Garbled data as described above occurs in a case where the order of execution of a read request and a write request with respect to the same address (same cache area) is changed.

It is an object of this invention to provide a system, a method, and an apparatus capable of preventing occurrence of garbled data caused by alteration of the order of execution of I/O requests in a system using an NVMe-compliant non-volatile memory as a cache.

The present invention can be appreciated by the description which follows in conjunction with the following figures, wherein: a computer system, comprising a server on which an application runs, and a storage system that stores data to be used by the application. The server includes a first processor, a first memory coupled to the first processor, a cache memory system coupled to the first processor, for providing a plurality of cache areas for temporarily storing data, a connection interface coupled to the first processor, for establishing connection to the cache memory system, and a first network interface coupled to the first processor, for establishing connection to another apparatus. The storage system includes a controller including a second processor, a second memory coupled to the second processor, and a second network interface coupled to the second processor, for establishing connection to another apparatus, and a plurality of storage apparatus coupled to the controller. The first memory stores a program for achieving an operating system that controls the server. The second memory stores a program for achieving a storage controller that controls the storage system. The operating system includes a cache driver for controlling cache data, a cache memory system driver for controlling an I/O process for the cache memory system, and a storage system driver for controlling an I/O process for the storage system. The cache memory system driver has a plurality of first queues. Each of the plurality of first queues registers at least one of I/O request for the cache memory system. The storage system driver has at least one second queue in which at least one of I/O request for the storage system is to be registered. A condition of each of the plurality of cache areas is configured so as to be switchable to any one of a first cache condition in which data is readable from a cache area and writing of data into the cache area is prohibited, a second cache condition in which reading of data from the cache area is prohibited and writing of data into the cache area is permitted, and a third cache condition in which reading of data from the cache area is prohibited and writing of data into the cache area is prohibited. The cache driver is configured to: determine whether a condition of a first cache area for storing cache data of data to be stored in a first storage area in the storage system is the first cache condition in a case of receiving from the application an instruction to register a first write request to command writing of data into the first storage area; and change the condition of the first cache area to the third cache condition from the first cache condition, in a case of determining that the condition of the first cache area is the first cache condition.

According to one embodiment of this invention, in a case where the cache driver in the computer system including the NVMe-compliant application and the NVMe-compliant storage system receives the write request for the cache area where the cache data is to be stored, the cache driver can inhibit writing in the cache area by changing the cache condition of the cache area. This can overcome the problem of occurrence of garbled data which would otherwise be caused by alteration of order of execution of I/O requests.

BRIEF DESCRIPTION OF THE DRAWINGS

The present invention can be appreciated by the description which follows in conjunction with the following figures, wherein:

FIG. 3 is an explanatory diagram illustrating a cache management table according to the first embodiment of this invention;

FIG. 4 is an explanatory diagram illustrating a cache queue condition table according to the first embodiment of this invention;

FIG. 7 is an explanatory diagram illustrating a configuration of one of execution queues according to the first embodiment of this invention;

FIG. 8 is an explanatory diagram illustrating a configuration of one of completion queues according to the first embodiment of this invention;

DETAILED DESCRIPTION OF THE PREFERRED EMBODIMENTS

The following describes embodiments of this invention in detail referring to the accompanying drawings.

First Embodiment

Figure 1:
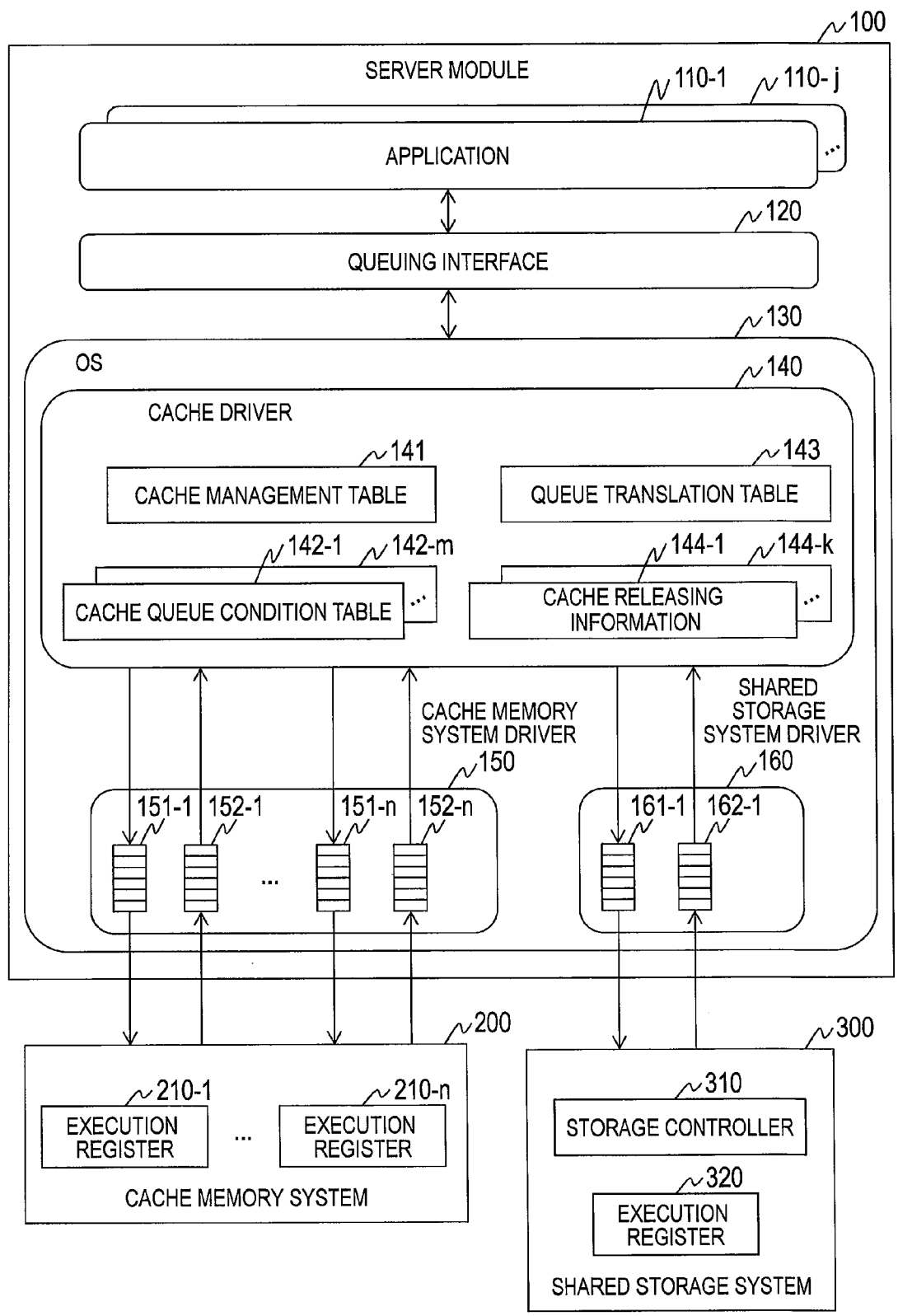
FIG. 1 is a block diagram illustrating the software configuration of a computer system according to a first embodiment of this invention.
Figure 2:
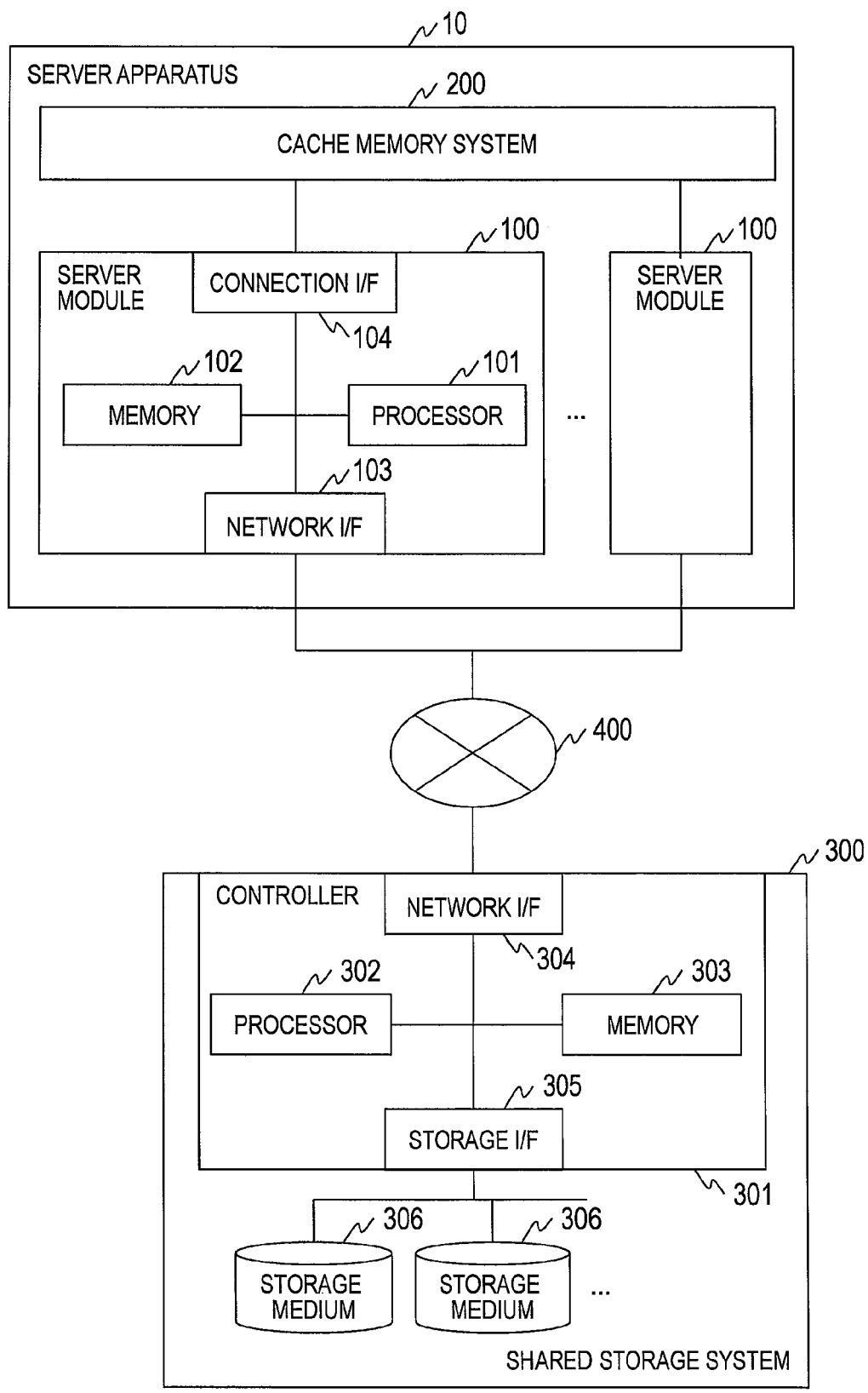
FIG. 2 is an explanatory diagram illustrating the hardware configuration of the computer system according to the first embodiment of this invention.

FIG. 1 is a block diagram illustrating the software configuration of a computer system according to a first embodiment of this invention. FIG. 2 is an explanatory diagram illustrating the hardware configuration of the computer system according to the first embodiment of this invention.

The computer system according to this invention includes a server apparatus 10 and a shared storage system 300. The server apparatus 10 and the shared storage system 300 are coupled to each other via a network 400. The network 400 may be a WAN, a LAN, a SAN, or the like. This invention is not limited by the type of a network. The server apparatus 10 and the shared storage system 300 may be coupled to each other directly.

The server apparatus 10 includes a plurality of server modules 100 and a cache memory system 200.

A server module 100 is a computer for performing a predetermined application 110, and includes a processor 101, a memory 102, a network interface 103, and a connection interface 104, which are interconnected by internal buses. The server module 100 may include other components, such as a storage medium and an input/output apparatus (not shown).

The processor 101 executes a program which is stored in the memory 102. As the processor 101 executes a program stored in the memory 102, the functions of the server module 100 are achieved.

The memory 102 stores the program to be executed by the processor 101, and information needed for the execution of the program. The memory 102 includes a work area which is used by the program. The program and information which are stored in the memory 102 are described later.

The network interface 103 establishes connection to another apparatus via the network 400.

The connection interface 104 establishes connection to the cache memory system 200. According to this embodiment, the server modules 100 are connected to the cache memory system 200 by a communication path to a PCIe bus. In this case, a PCIe interface is used as the connection interface 104.

The cache memory system 200 provides a storage area to be used by the server module 100. The cache memory system 200 includes a non-volatile memory (non-volatile memory element) such as a flash memory. The cache memory system 200 includes a controller (not shown) for controlling the non-volatile memory.

In this embodiment, a plurality of pieces of cache data store the storage area provided by the cache memory system 200 by unit of logical block of an logical unit (LU). Blocks of data may be managed using a buffer cache. The buffer cache is generated by allocating a buffer page to the storage area in the cache memory system 200, and dividing the buffer page to block buffers of a predetermined block size.

The buffer cache includes a buffer head for specifying the storage location for each of the plurality of logical blocks of data in the shared storage system 300. It should be noted that the LU is provided by the shared storage system 300 as described later.

In the following description, a logical block of data is also referred to as block data, and a storage area of a logical block size is also referred to as cache area.

In this embodiment, it is assumed that the plurality of server modules 100 share the cache memory system 200 for use. This invention is not limited to this configuration, and a single cache memory system 200 may be connected to a single server module 100. Alternatively, the cache memory system 200 may be located inside the server module 100. Still alternately, the cache memory system 200 may be located outside the server apparatus 10.

Although the cache memory system 200 including a non-volatile memory is used in this embodiment, a cache memory system including a volatile memory may be used.

The shared storage system 300 provides a storage area for storing data or the like to be used by the application 110 executed on each server module 100. The shared storage system 300 includes a controller 301 and a plurality of storage media 306.

The controller 301 controls the shared storage system 300. The controller 301 includes a processor 302, a memory 303, a network interface 304, and a storage interface 305, which are interconnected by internal buses.

The processor 302 executes a program which is stored in the memory 303. As the processor 302 executes a program stored in the memory 303, the functions of the shared storage system 300 are achieved.

The memory 303 stores the program to be executed by the processor 302, and information needed for the execution of the program. The memory 303 includes a work area which is used by the program. The program and information which are stored in the memory 303 are described later.

The network interface 304 establishes connection to another apparatus over the network 400.

The storage interface 305 establishes connection to the storage media 306. The storage medium 306 is an apparatus for storing data. The storage medium 306 may be an HDD or an SSD, for example. The storage medium 306 may be any type of apparatus capable of storing data.

Next, the software configurations of the server module 100, the cache memory system 200, and the shared storage system 300 are described.

The memory 102 of the server module 100 stores programs for achieving a plurality of applications 110, a queuing interface 120, and an OS 130. These programs are executed by the processor 101.

The application 110 performs a predetermined service. This invention is not limited by the type of application 110.

The queuing interface 120 controls the I/O between the application 110 and the cache memory system 200 and shared storage system 300. Specifically, the queuing interface 120 registers an I/O request in a queue, and controls execution of the I/O request registered in the queue. In this embodiment, it is assumed that an NVMe-compliant interface is used as the queuing interface 120.

The queuing interface 120 may be included in the application 110 or the OS 130. Further, the queuing interface 120 is not limited by an NVMe-compliant interface.

The OS 130 performs the general control of the server module 100. The OS 130 includes a cache driver 140, a cache memory system driver 150, and a shared storage system driver 160.

The OS 130 formats an LU provided by the shared storage system 300 into a predetermined file system. At this time, the OS 130 divides the LU into predetermined logical blocks, and assigns identification numbers to the logical blocks. The file system manages data including at least one block data as a file.

The file system or the like included in the OS 130 is publicly known, and hence its description is omitted.

The cache driver 140 controls cache data in a cache area. In a case of receiving a read request from the application 110, for example, the cache driver 140 performs the following cache control process.

First, the cache driver 140 determines whether data to be read is stored in the cache memory system 200. In a case where data to be read is stored in the cache memory system 200, the cache driver 140 reads out the data from at least one of cache areas of the cache memory system 200 and transmits the application 110 with the read data as a response of the read request. In a case where data to be read is not stored in the cache memory system 200, the cache driver 140 registers a read request for the shared storage system 300 and transmits the application 110 with data read out from the shared storage system 300 based on the read request as a response of the read request.

The cache driver 140 according to this embodiment includes a cache management table 141, a plurality of cache queue condition tables 142, a queue translation table 143, and a plurality of pieces of cache releasing information 144.

The cache management table 141 stores information for managing the cache areas of the cache memory system 200. The details of the cache management table 141 are described later referring to FIG. 3.

The cache queue condition table 142 stores information for managing conditions of queues held by the cache memory system driver 150. The details of the cache queue condition table 142 are described later referring to FIG. 4.

It should be noted that the number of the cache queue condition tables 142 matches the number of devices that are used by the OS 130 at the time of accessing the cache memory system 200. The devices are identifiable by the OS 130, and may be physical devices or virtual devices. This invention is not limited by the number of the cache queue condition tables 142.

The queue translation table 143 stores information indicating the correlation among an application queue, the queue of the cache memory system driver 150, and the queue of the shared storage system driver 160. The details of the queue translation table 143 are described later referring to FIG. 5.

The application queue is provided to the application 110 by the queuing interface 120. In this embodiment, it is assumed that the queuing interface 120 provides a single application 110 with at least one application queue.

The cache releasing information 144 stores information that is used at the time of releasing the cache area. The details of the cache releasing information 144 are described later referring to FIG. 6.

It is assumed that the number of pieces of the cache releasing information 144 is a preset number. For example, the number of pieces of the cache releasing information 144 may be set in association with the number of cache queues. This invention is not limited by the number of pieces of the cache releasing information 144.

The cache memory system driver 150 controls access to the cache memory system 200. The cache memory system driver 150 has a plurality of pairs of execution queues 151 and completion queues 152. In the following description, the pair of the execution queue 151 and the completion queue 152 is also referred to as cache queue.

The execution queue 151 is for registering an I/O request. The completion queue 152 is for registering a response to an I/O request. In this embodiment, it is assumed that at least one pair of the execution queue 151 and the completion queue 152 (cache queue) is allocated to a single application 110. This architecture can achieve efficient cache control.

In the example illustrated in FIG. 1, a pair of an execution queue 151-1 and a completion queue 152-1 is allocated to an application 110-1, and a pair of an execution queue 151-$n$ and a completion queue 152-$n$ is allocated to an application 110-$n$.

The shared storage system driver 160 controls access to the shared storage system 300. The shared storage system driver 160 has at least one pair of an execution queue 161 and a completion queue 162. In the following description, the pair of the execution queue 161 and the completion queue 162 is also referred to as storage queue.

The controller of the cache memory system 200 has a plurality of execution registers 210 respectively corresponding to a plurality of cache queues. The number of the execution registers 210 is the same as the number of cache queues (number of pairs). In the example illustrated in FIG. 1, an execution register 210-1 corresponds to the pair of the execution queue 151-1 and the completion queue 152-1, and an execution register 210-$n$ corresponds to the pair of the execution queue 151-$n$ and the completion queue 152-$n$.

The memory 303 of the shared storage system 300 stores a program for achieving a storage controller 310.

The storage controller 310 controls the shared storage system 300. In this embodiment, a RAID is configured using the plurality of storage media 306. The storage controller 310 logically divides the RAID volume to produce a plurality of logical units (LUs), and provides each of the server modules 100 with the plurality of produced LUs. The storage controller 310 has management information indicating the correlation between the LU and the storage media 306.

The controller 301 of the shared storage system 300 has an execution register 320 corresponding to the pair of the execution queue 161 and the completion queue 162 provided in the shared storage system driver 160.

In a case of receiving an I/O request for an LU from the server module 100 via the execution register 320, the storage controller 310 access the storage medium 306 that provides a storage area (logical block) constructing the LU, based on the management information.

The storage controller 310 has various functions including an LU management function, a data transfer function, and a cache control function, but those functions are publicly-known technologies, and hence their details descriptions are omitted.

FIG. 3 is an explanatory diagram illustrating the cache management table 141 according to the first embodiment of this invention.

The cache management table 141 includes a cache memory address 1411, a shared storage system address 1412, a data valid bit 1413, and a write valid bit 1414.

The cache memory address 1411 is the head address of the cache area of the cache memory system 200. The shared storage system address 1412 is the storage location of the data stored in the cache area in the shared storage system 300, in other words, the head address of the storage area in the shared storage system 300.

In the example shown in FIG. 3, a first entry represents that data to be stored in the storage area corresponding to an address "0x2000" in the shared storage system 300 is stored in the cache area at the address "0x1000" in the cache memory system 200.

The data valid bit 1413 indicates whether data is readable from the cache area corresponding to the cache memory address 1411. In other words, the data valid bit 1413 indicates whether readable data is stored in the cache area.

The data valid bit 1413 of "0" indicates that data is not readable from the cache area corresponding to the cache memory address 1411. In this embodiment, in a case where data is not stored in the cache area, or in a case where data is stored in the cache area corresponding to the cache memory address 1411 but is not readable therefrom, the data valid bit 1413 is set to "0".

On the other hand, the data valid bit 1413 of "1" indicates that data is readable from the cache area corresponding to the cache memory address 1411. In other words, data to be stored in the storage area corresponding to the shared storage system address 1412 is stored in the cache area corresponding to the cache memory address 1411.

The write valid bit 1414 indicates whether data is writable in the cache area corresponding to the cache memory address 1411.

The write valid bit 1414 of "0" indicates that data is not writable in the cache area corresponding to the cache memory address 1411. On the other hand, the write valid bit 1414 of "1" indicates that data is writable in the cache area corresponding to the cache memory address 1411.

In this embodiment, the cache area can be switched to one of three conditions.

The first condition is a first cache condition that permits a read request for the cache area and inhibits a write request for the cache area. In the first cache condition, the data valid bit 1413 becomes "1", and the write valid bit 1414 becomes "0".

The second condition is a second cache condition that inhibits a read request for the cache area and permits a write request for the cache area. In the second cache condition, the data valid bit 1413 becomes "0", and the write valid bit 1414 becomes "1".

The third condition is a third cache condition that inhibits a read request for the cache area and inhibits a write request for the cache area. In the third cache condition, the data valid bit 1413 becomes "0", and the write valid bit 1414 becomes "0".

As described later, to avoid occurrence of garbled data, the cache driver 140 performs control so that both of the data valid bit 1413 and the write valid bit 1414 do not become "1".

FIG. 4 is an explanatory diagram illustrating the cache queue condition table 142 according to the first embodiment of this invention.

The cache queue condition table 142 includes a cache queue number 1421 and an execution waiting queue bit 1422. In this embodiment, the cache queue condition table 142 includes one entry for each pair of the execution queue 151 and the completion queue 152, namely, the cache queue.

The cache queue number 1421 is an identification number given to the pair of the execution queue 151 and the completion queue 152, namely, the cache queue. In this embodiment, it is assumed that the execution queue 151 and the completion queue 152 can also be identified by the cache queue number 1421. In other words, the execution queue 151 and the completion queue 152 are given an identification number corresponding to the cache queue number 1421.

The execution waiting queue bit 1422 indicates whether there is an I/O request that is registered in the execution queue 151 and has not been executed.

The execution waiting queue bit 1422 of "0" indicates that there is not an unexecuted I/O request in the execution queue 151. On the other hand, the execution waiting queue bit 1422 of "1" indicates that there is an unexecuted I/O request in the execution queue 151.

Figures 5, 6:
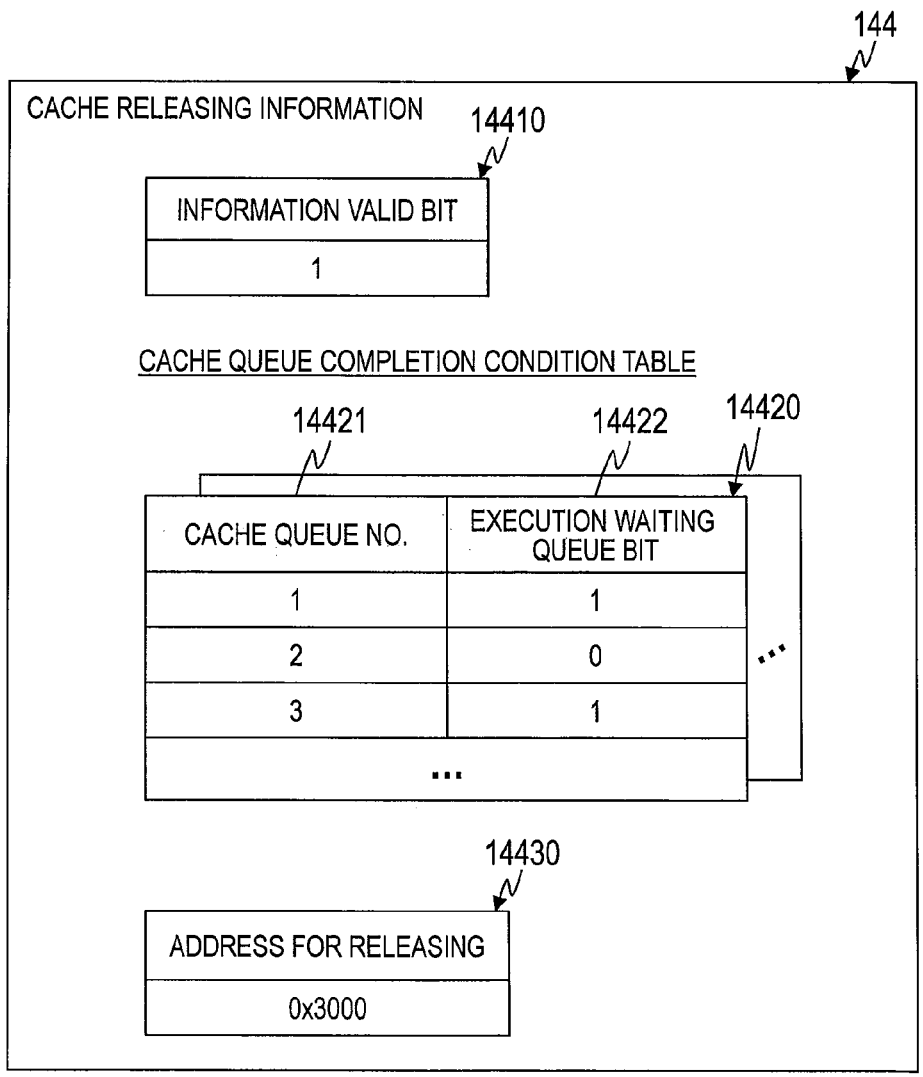
FIG. 5 is an explanatory diagram illustrating a queue translation table according to the first embodiment of this invention.
FIG. 6 is an explanatory diagram illustrating cache releasing information according to the first embodiment of this invention.

FIG. 5 is an explanatory diagram illustrating the queue translation table 143 according to the first embodiment of this invention.

The queue translation table 143 includes an application queue number 1431, a cache queue number 1432, and a storage queue number 1433. In this embodiment, the queue translation table 143 includes one entry for each application queue.

The application queue number 1431 is the identification number of an application queue. The cache queue number 1432 is the identification number of a cache queue. The storage queue number 1433 is the identification number of a storage queue.

In this embodiment, the cache driver 140 uses the queue translation table 143 to translate an I/O request received from the application 110 into an I/O request for the cache memory system 200 or the shared storage system 300. Specifically, the following process is performed.

First, the application 110 instructs registration of an I/O request including an application queue number via the queuing interface 120.

In a case of receiving the I/O request for the cache memory system 200, the cache driver 140 refers to the application queue number 1431 in the queue translation table 143 to retrieve an entry corresponding to the input application queue number.

The cache driver 140 uses the cache queue number 1432 in the retrieved entry to translate the instruction to register the received I/O request to an instruction to register an I/O request for the cache memory system driver 150.

In a case of receiving the I/O request for the shared storage system 300, the cache driver 140 refers to the application queue number 1431 in the queue translation table 143 to retrieve an entry corresponding to the input application queue number.

The cache driver 140 uses the storage queue number 1433 in the retrieved entry to translate the instruction to register the received I/O request to an instruction to register an I/O request for the shared storage system driver 160.

FIG. 6 is an explanatory diagram illustrating the cache releasing information 144 according to the first embodiment of this invention.

The cache releasing information 144 includes an information valid bit 14410, a cache queue completion condition table 14420, and an address for releasing 14430.

The information valid bit 14410 is information indicating whether the cache queue completion condition table 14420 is valid. The information valid bit 14410 is also information indicating whether the cache releasing information 144 is being used.

The information valid bit 14410 of "0" indicates that the cache queue completion condition table 14420 is not valid and the cache releasing information 144 is not used. On the other hand, the information valid bit 14410 of "1" indicates that the cache queue completion condition table 14420 is valid and the cache releasing information 144 is being used.

The cache queue completion condition table 14420 stores information indicating the condition of the cache queue which is held by the cache driver 140 at the time of releasing the cache. In other words, the cache queue completion condition table 14420 corresponds to a copy of the cache queue condition table 142 at the time of releasing the cache.

Specifically, the cache queue completion condition table 14420 includes a cache queue number 14421 and an execution waiting queue bit 14422. The cache queue number 14421 and the execution waiting queue bit 14422 are the same as the cache queue number 1421 and the execution waiting queue bit 1422, and hence their descriptions are omitted.

The address for releasing 14430 is the address of a cache area to be released.

The cache driver 140 uses the cache releasing information 144 in a cache releasing process to be described later.

Next, the configurations of the execution queues 151 and 161 and the completion queues 152 and 162 are described.

FIG. 7 is an explanatory diagram illustrating the configuration of one of the execution queues 151 and 161 according to the first embodiment of this invention. The following description is given of the execution queue 151 as an example. The execution queue 161 has the same configuration as that of the execution queue 151.

The execution queue 151 includes an entry number 1511, a command 1512, a destination address 1513, data 1514, and an I/O request valid bit 1515.

The entry number 1511 is an identification number given to an entry of the execution queue 151. As shown in FIG. 7, each execution queue 151 has a plurality of entries. The shared storage system driver 160 likewise has a plurality of entries.

The command 1512 is the type of an I/O request registered in an execution queue 151 corresponding to the entry number 1511. In a case where the command 1512 is "Read", it represents that a read request is registered in the execution queue, whereas in a case where the command 1512 is "Write", it represents that a write request is registered in the execution queue.

The destination address 1513 indicates the head address of a cache area which is the target of the I/O request corresponding to the command 1512.

The data 1514 indicates data to be written in a write request. The data 1514 is null in a case where the registered I/O request is a read request.

The I/O request valid bit 1515 indicates whether an I/O request corresponding to the command 1512 in the concerned entry is valid.

FIG. 8 is an explanatory diagram illustrating the configuration of one of the completion queues 152 and 162 according to the first embodiment of this invention. The following description is given of the completion queue 152 as an example. The completion queue 162 has the same configuration as that of the completion queue 152.

The execution queue 152 includes an execution queue entry number 1521 and a completion bit 1522.

The execution queue entry number 1521 indicates to which I/O request registered in which entry of which execution queue 151 a notification of completion registered in the completion queue 152 corresponds. The execution queue entry number 1521 is the same as the entry number 1511.

The completion bit 1522 is information indicating whether execution of an I/O request (command 1512) registered in the execution queue 151 corresponding to the execution queue entry number 1521 is completed.

The completion bit 1522 of "0" indicates that execution of an I/O request registered in the execution queue 151 is not completed, whereas the completion bit 1522 of "1" indicates that execution of an I/O request registered in the execution queue 151 is completed.

Next, the flows of the operations of the application and the cache driver according to this invention are described.

Figure 9:
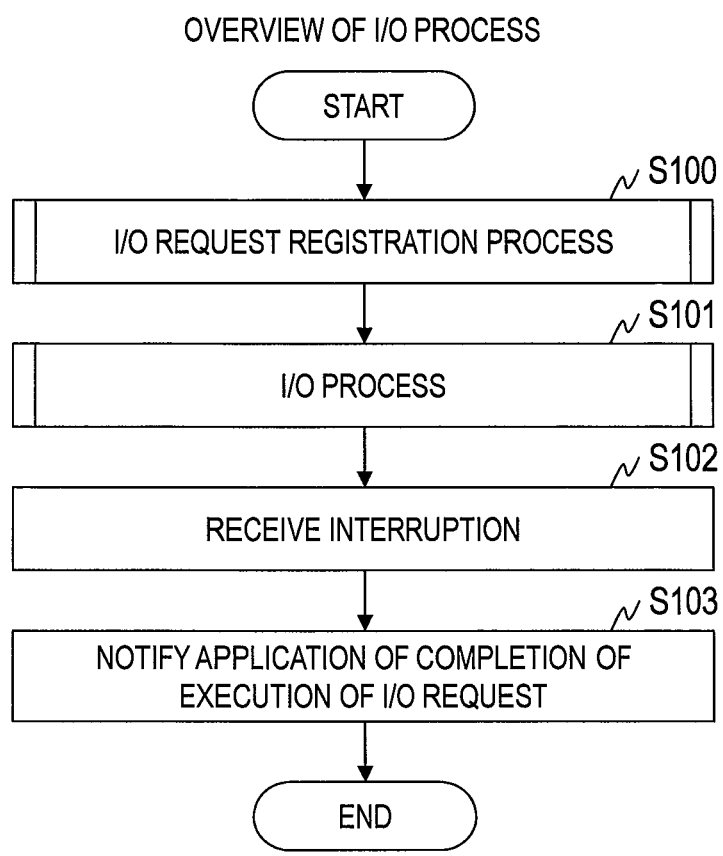
FIG. 9 is a flowchart illustrating the overview of an I/O process according to the first embodiment of this invention.

FIG. 9 is a flowchart illustrating the overview of an I/O process according to the first embodiment of this invention.

Referring to FIG. 9, a description is given of the flow of processing by the OS 130 from reception of an instruction to register an I/O request issued by the application 100 and an instruction to execute the I/O request to replying of the result of execution of the I/O request to the application 110.

In a case of receiving the instruction to register an I/O request for an application queue from the application 110, the OS 130 invokes the cache driver 140 and initiates the following process.

To instruct registration of an I/O request, the application 110 performs the following process. First, the application 110 determines a storage area (destination address) where data to be processed is to be stored, data to be processed, and the identification number of an application queue. Through use of the queuing interface 120, the application 110 inputs an I/O request registration instruction including the type (command) of the I/O request, the destination address, the data to be processed, and the application queue.

The cache driver 140 performs a process of registering the I/O request in the execution queue (Step S100). As a result, the I/O request is registered in the execution queue 151 that the cache memory system driver 150 has, or the execution queue 161 that the shared storage system driver 160 has. The details of the I/O request registration process are described later referring to FIGS. 10 and 11.

In a case of receiving the I/O request execution instruction from the application 110, the cache driver 140 executes an I/O process corresponding to the I/O request registered in the execution queue (Step S101).

Specifically, the cache driver 140 invokes the cache memory system driver 150 or the shared storage system driver 160, and instructs the cache memory system driver 150 or the shared storage system driver 160 to execute the I/O request. The details of the I/O process are described later referring to FIG. 13.

The application 110 inputs the instruction to execute the I/O request registered in the application queue by using the queuing interface 120. At this time, the application 110 inputs the I/O request execution instruction including an application queue number.

In a case of receiving an interruption from the cache memory system 200 or the shared storage system 300 (Step S102), the cache memory system driver 150 or the shared storage system driver 160 notifies the application 110 of completion of the I/O request via the cache driver 140 (Step S103), and then terminates the process.

The above-mentioned processing completes the process of an I/O request (command) registered in the application queue.

Figure 10:
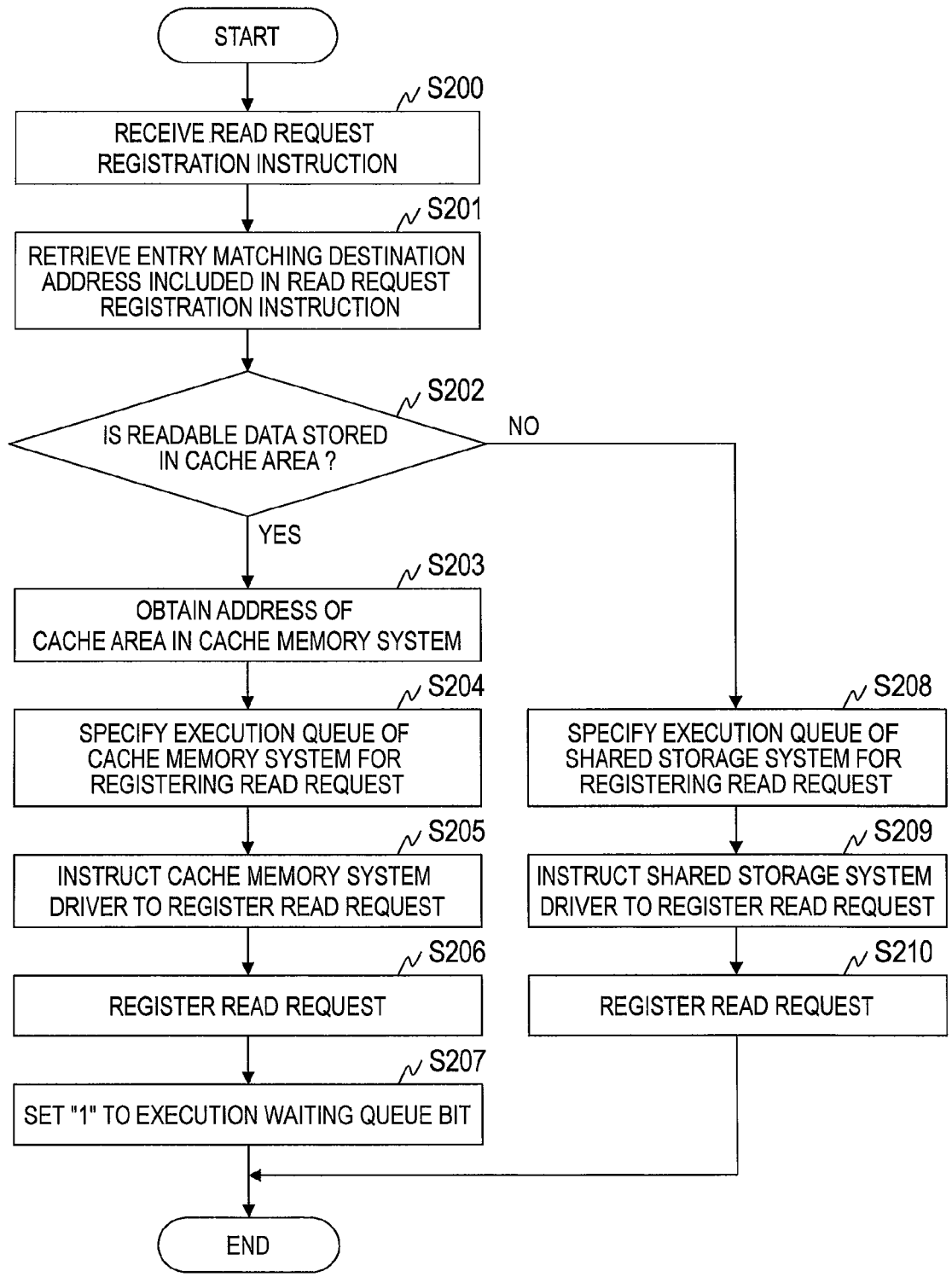
FIGS. 10 and 11 are flowcharts illustrating an example of an I/O request registration process according to the first embodiment of this invention.
Figure 11:
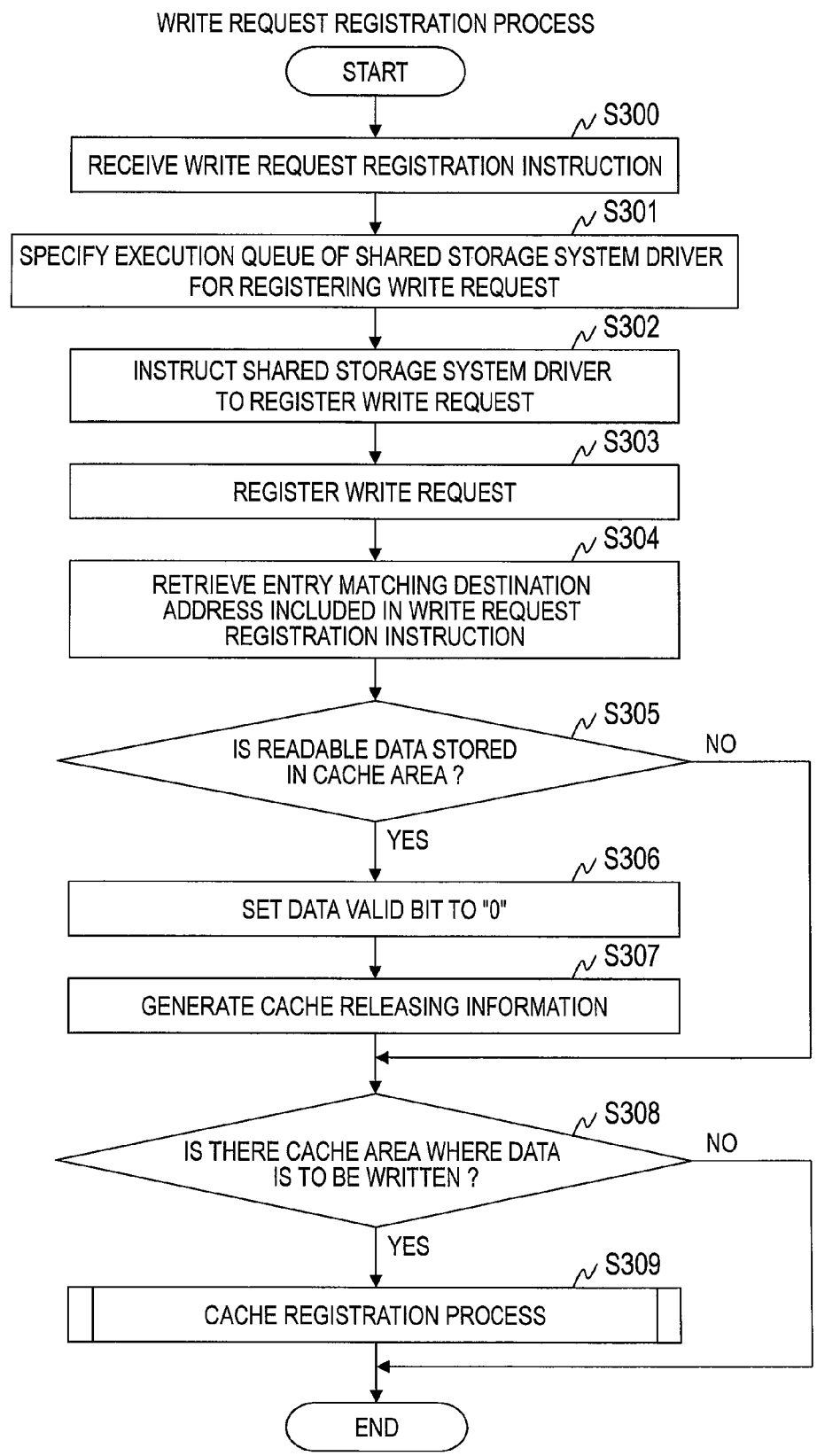

FIGS. 10 and 11 are flowcharts illustrating an example of an I/O request registration process according to the first embodiment of this invention.

FIG. 10 illustrates a read request registration process. FIG. 11 illustrates a write request registration process.

First, an I/O request registration process which is performed in a case where a read request registration instruction is received is described.

The cache driver 140 receives I/O request (read request) registration instruction whose command is "Read" via the queuing interface 120 (Step S200).

The cache driver 140 refers to the cache management table 141 to retrieve an entry whose shared storage system address 1412 matches the destination address included in the read request registration instruction (Step S201).

The cache driver 140 determines whether readable data to be read is stored in a cache area corresponding to the destination address based on the retrieval result (Step S202). In other words, it is determined whether the cache area corresponding to the destination address is in the first cache condition. Specifically, the following process is performed.

The cache driver 140 determines whether there is an entry whose shared storage system address 1412 matches the destination address based on the retrieval result.

In a case of determining that there is an entry whose shared storage system address 1412 matches the destination address, the cache driver 140 determines whether the data valid bit 1413 in the retrieved entry is "1".

In a case of determining that the data valid bit 1413 in the retrieved entry is "1", the cache driver 140 determines that readable data is stored in the cache memory system 200.

In a case of determining that there is not an entry whose shared storage system address 1412 matches the destination address or that the data valid bit 1413 in the retrieved entry is "0", the cache driver 140 determines that readable data to be read is not stored in the cache memory system 200.

The above is the description of the process of Step S202.

In a case of determining that readable data to be read is stored in the cache area corresponding to the destination address, the cache driver 140 refers to the cache management table 141 to obtain the address of the cache area in the cache memory system 200 (Step S203).

Specifically, the cache driver 140 obtains an address stored in the cache memory address 1411 in the retrieved entry.

In addition, the cache driver 140 refers to the queue translation table 143 to specify an execution queue 151 for the cache memory system 200 which a read request is to be registered (Step S204). Specifically, the following process is performed.

The cache driver 140 refers to the queue translation table 143 to retrieve an entry whose application queue number 1431 matches an application queue number included in the read request registration instruction.

The cache driver 140 reads out an identification number stored in the cache queue number 1432 in the retrieved entry. An execution queue 151 corresponding to the read identification number is an execution queue 151 which the read request is to be registered.

The above is the description of the process of Step S204.

Next, the cache driver 140 invokes the cache memory system driver 150, and instructs the cache memory system driver 150 to register a read request (Step S205). At this time, the cache driver 140 notifies the cache memory system driver 150 of the obtained address of the cache area and the identification number of the specified execution queue 151.

The cache memory system driver 150 registers the read request in the execution queue 151 corresponding to the notified identification number of the execution queue 151 (Step S206).

Specifically, the cache memory system driver 150 registers the read request in which "Read" is set in the command 1512, the notified address of the cache area is set in the destination address 1513, and "1" is set in the I/O request valid bit 1515 in the execution queue 151 corresponding to the notified identification number.

The cache driver 140 sets the execution waiting queue bit 1422 of the entry corresponding to the execution queue 151 which the read request is registered to "1" referring to the cache queue condition table 142 (Step S207), and then terminates the processing.

The process of Step S207 is to prevent occurrence of garbled data which is caused by skipping of I/O requests with respect to the same address, and shows that an unexecuted read request is present in the execution queue 151.

In a case where it is determined in Step S202 that a readable data to be read is not stored in the cache area corresponding to the destination address, in other words, in a case where there is a cache miss, the cache driver 140 refers to the queue translation table 143 to specify an execution queue 161 in the shared storage system 300 which a read request is to be registered (Step S208). The process of Step S208 is similar to the process of Step S204, and hence its description is omitted.

The cache driver 140 invokes the shared storage system driver 160, and instructs the shared storage system driver 160 to register a read request (Step S209). At this time, the cache driver 140 notifies the shared storage system driver 160 of the input destination address and the identification number of the specified execution queue 161.

The shared storage system driver 160 registers the read request in the execution queue 161 corresponding to the notified identification number of the execution queue 161 (Step S210), and then terminates the processing.

Specifically, the shared storage system driver 160 registers the read request in which "Read" is set in the command, the input destination address is set in the destination address, and "1" is set in the valid bit in the execution queue 161 corresponding to the notified identification number of the execution queue 161.

Next, an I/O request registration process which is performed in a case where a write request registration instruction is received is described.

The cache driver 140 receives an I/O request (write request) registration instruction whose command is "Write" via the queuing interface 120 (Step S300).

The cache driver 140 refers to the queue translation table 143 to specify an execution queue 161 for the shared storage system 300 which a write request is to be registered (Step S301). Specifically, the following process is performed.

The cache driver 140 refers to the queue translation table 143 to retrieve an entry whose application queue number 1431 matches an application queue number included in the write request registration instruction.

The cache driver 140 reads out an identification number stored in the storage queue number 1433 in the retrieved entry. An execution queue 161 corresponding to the read identification number is an execution queue 161 which the write request is to be registered.

The above is the description of the process of Step S301.

Next, the cache driver 140 invokes the shared storage system driver 160, and instructs the shared storage system driver 160 to register a write request (Step S302). At this time, the cache driver 140 notifies the shared storage system driver 160 of the input destination address and the identification number of the specified execution queue 161.

The shared storage system driver 160 registers the write request in the execution queue 161 corresponding to the notified identification number of the execution queue 161 (Step S303).

Specifically, the shared storage system driver 160 registers the write request in which "Write" is set in the command, the input destination address is set in the destination address, and "1" is set in the I/O request valid bit in the execution queue 161 corresponding to the notified identification number.

The cache driver 140 refers to the cache management table 141 to retrieve an entry whose shared storage system address 1412 matches the destination address included in the write request registration instruction (Step S304).

Data is written in the shared storage system 300 regardless of a cache hit or a cache miss to protect data to be written. The protection is performed because in a case where data is written only in the server module 100, for example, data may be lost due to a power failure or the like of the server module 100. For a system that deals with data which need not be protected, the processes from Step S300 to Step S304 may be omitted in a case where there is a cache hit.

The cache driver 140 determines whether readable data is stored in a cache area corresponding to the destination address based on the retrieval result (Step S305). In other words, it is determined whether the cache area corresponding to the destination address is in the first cache condition. The process of Step S305 is the same as the process of Step S202, and hence its description is omitted.

In a case of determining that readable data is stored in the cache area corresponding to the destination address, the cache driver 140 sets the data valid bit 1413 to "0" to prohibit reading of data from this cache area (Step S306). In other words, the condition of the cache area is changed to the third cache condition from the first cache condition. In this case, although readable data is stored in this cache area, registration of an I/O request into the cache area is prohibited thereafter.

The cache driver 140 generates cache releasing information 144 relating to the cache area where registration of an I/O request is prohibited (Step S307). Specifically, the following process is performed.

First, the cache driver 140 generates empty cache releasing information 144, and sets "1" as the information valid bit 14410. The cache driver 140 then registers the address of the cache area where registration of an I/O request is prohibited in the address for releasing 14430.

The cache driver 140 obtains a copy of every cache queue condition table 142 at this point of time, and registers the copy as the cache queue completion condition table 14420 in the cache releasing information 144.

In a case where there is cache releasing information 144 in which the information valid bit 14410 is "0" and the cache queue completion condition table 14420 is not registered, the cache driver 140 may set necessary information in this cache releasing information 144.

The above is the description of the process of Step S307.

In a case of determining in Step S305 that readable data is not stored in the cache area corresponding to the destination address, or after execution of the process of Step S307, the cache driver 140 refers to the cache management table 141 to determine whether a cache area for storing data to be written in the write request is present in the cache memory system 200 (Step S308).

Specifically, the cache driver 140 retrieves an entry with the write valid bit 1414 of "1" from the cache management table 141. In other words, a cache area in the second cache condition is retrieved.

In a case of determining that there are as many entries with the write valid bit 1414 of "1" as the number of cache areas needed to write data to be written, the cache driver 140 determines that a cache area for storing data to be written is present in the cache memory system 200.

In a case of determining that a cache area for storing data to be written is not present in the cache memory system 200, the cache driver 140 terminates the processing.

In a case of determining that a cache area for storing data to be written is present in the cache memory system 200, the cache driver 140 performs a cache registration process (Step S309), and then terminates the processing. The details of the cache registration process are described later referring to FIG. 12. The process of Step S308 and the process of Step S309 may be omitted in a case where the process of Step S300 is performed. In this case, the written data is present only in the shared storage system 300.

Figure 12:
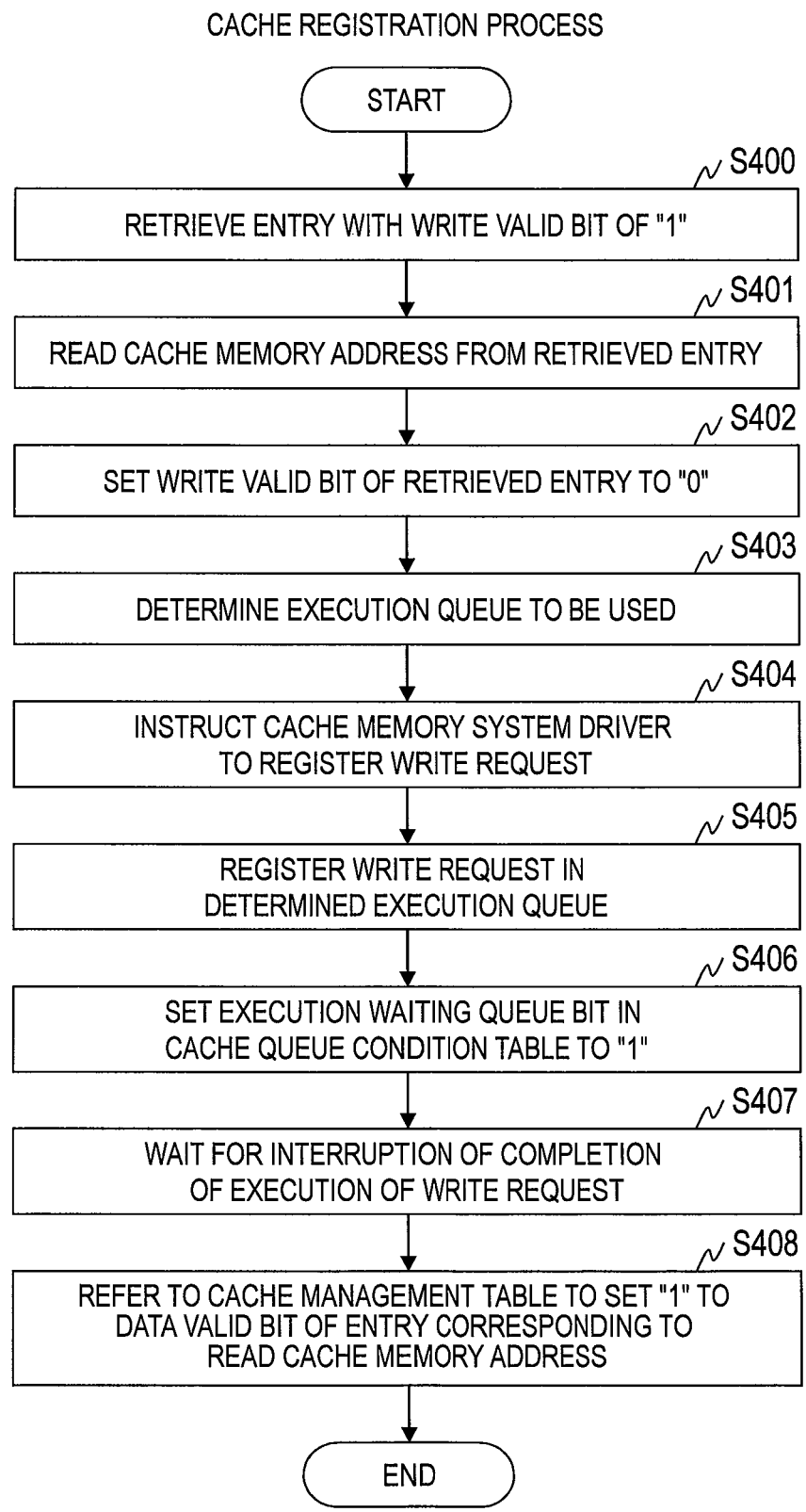
FIG. 12 is a flowchart illustrating a cache registration process according to the first embodiment of this invention.

FIG. 12 is a flowchart illustrating the cache registration process according to the first embodiment of this invention.

The cache driver 140 refers to the cache management table 141 to retrieve one entry with the write valid bit 1414 of "1" (Step S400). In other words, a cache area in the second cache condition is retrieved.

The cache driver 140 reads out the cache memory address 1411 of the retrieved entry (Step S401), and sets the write valid bit 1414 in the entry to "0" (Step S402). In other words, the condition of the cache area is changed to the third cache condition from the second cache condition. Thereafter, registration of an I/O request into the cache area is prohibited.

The cache driver 140 determines an execution queue 151 to be used to register a write request for the retrieved cache area (Step S403). In other words, the identification number of the execution queue 151 is determined.

A cache queue is allocated for each OS 130 in this embodiment, and hence a cache queue allocated any OS 130 is permitted to be used temporarily. For example, a method in which a cache queue for which a command has been generated last is used by priority is conceivable.

The cache driver 140 invokes the cache memory system driver 150, and instructs the cache memory system driver 150 to register a write request (Step S404). At this time, the cache driver 140 notifies the cache memory system driver 150 of the read address of the cache area and the identification number of the determined execution queue 151.

The cache memory system driver 150 registers the write request in the determined execution queue 151 (Step S405).

Specifically, the cache memory system driver 150 registers the write request in which "Write" is set in the command 1512, the read address of the cache area is set in the destination address 1513, and "1" is set in the I/O request valid bit 1515 in the determined execution queue 151.

The cache driver 140 refers to the cache queue condition table 142 to retrieve an entry whose cache queue number 1421 matches the identification number of the determined execution queue 151, and sets the execution waiting queue bit 1422 of the retrieved entry to "1" (Step S406).

Then, the cache driver 140 waits until a write request registered in the execution queue 151 is executed and an interruption of execution completion is performed (Step S407). In other words, the cache driver 140 stands by until data is written in the cache area.

After receiving the interruption of completion of execution of the write request registered in the execution queue 151, the cache driver 140 sets the data valid bit 1413 of the entry in the cache management table 141 which is retrieved in Step S400 to "1" (Step S408). In other words, the condition of the cache area is changed to the first cache condition from the third cache condition. Thereafter, reading of data from the cache area is enabled.

Although the cache driver 140 determines an execution queue 151 to be used from a cache queue in Step S403, this invention is not limited to this configuration. A cache queue for the cache driver 140 which is used at the time of registering cache data may be set in advance in the cache memory system driver 150. In this case, the cache driver 140 may execute a write request registered in a dedicated execution queue 151 at an arbitrary timing. In addition, the process of Step S406 may be omitted.

The above-mentioned cache registration process is performed at a timing other than the time of registering a write request. For example, the cache registration process is performed in a case where data read out from the shared storage system 300 is stored in the cache memory system 200. By managing the history of I/O processes, the cache driver 140 itself periodically determines whether there is data to be stored in the cache area, and based on the result of the determination, performs the cache registration process, for example, in a case where data is stored in the cache memory system 200.

Figure 13:
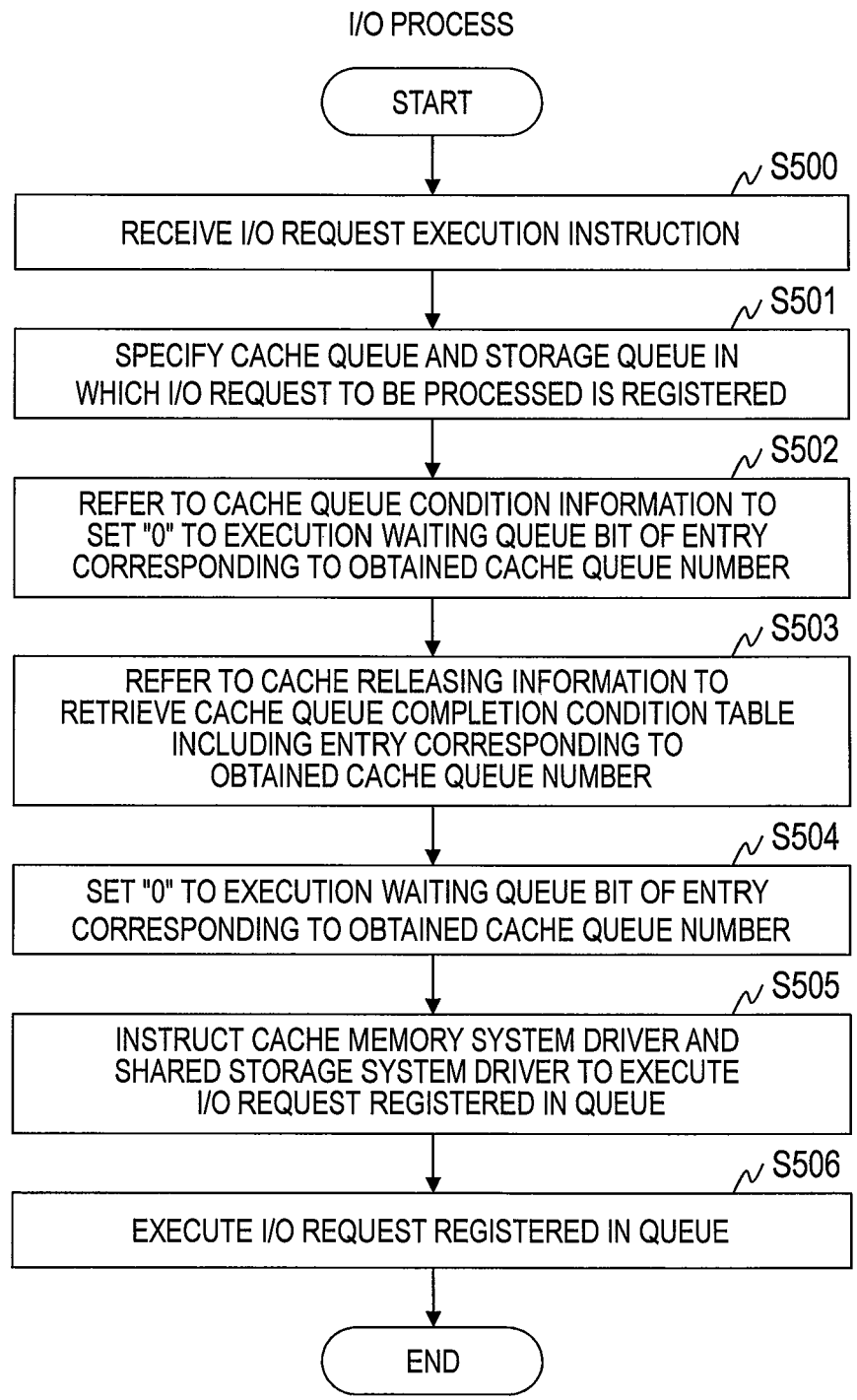
FIG. 13 is a flowchart illustrating an I/O process for an I/O request registered in an execution queue according to the first embodiment of this invention.

FIG. 13 is a flowchart illustrating an I/O process for an I/O request registered in the execution queue according to the first embodiment of this invention.

In a case of receiving an instruction to execute an I/O request registered in an application queue from the application 110, the OS 130 invokes the cache driver 140 to initiate the following processes.

In instructing execution of an I/O request, the application 110 determines the number of an application queue to be processed, and inputs an instruction to execute the I/O request including the determined application queue number via the queuing interface 120.

In a case of receiving the I/O request execution instruction (Step S500), the cache driver 140 specifies a cache queue and a storage queue in which the I/O request to be processed is to be registered (Step S501).

Specifically, the cache driver 140 refers to the queue translation table 143 to retrieve an entry whose application queue number 1431 matches the application queue number included in the received I/O request execution instruction. The cache driver 140 obtains the cache queue number 1432 and storage queue number 1433 of the retrieved entry.

The cache driver 140 refers to the cache queue condition table 142 to set the execution waiting queue bit 1422 of the entry whose cache queue number matches the obtained cache queue number to "0" (Step S502).

The cache driver 140 refers to the cache queue completion condition table 14420 of the cache releasing information 144 to retrieve the cache queue completion condition table 14420 including an entry whose cache queue number 14421 matches the obtained cache queue number 1432 (Step S503).

Further, the cache driver 140 refers to the retrieved cache queue completion condition table 14420 to set the execution waiting queue bit 14222 of the entry whose cache queue number 14421 matches the obtained cache queue number 1432 to "0" (Step S504).

Through the processing from Step S502 to Step S504, it is known that I/O requests registered in the cache queue are all executed.

The cache driver 140 instructs each of the cache memory system driver 150 and the shared storage system driver 160 to execute the I/O request to be processed (Step S505).

At this time, the cache driver 140 notifies the cache memory system driver 150 of the obtained cache queue number 1432, and notifies the shared storage system driver 160 of the obtained storage queue number 1433.

The cache memory system driver 150 and the shared storage system driver 160 respectively execute the I/O requests to be processed which are respectively registered in the execution queue 151 corresponding to the notified cache queue number 1432 and the execution queue 161 corresponding to the notified storage queue number 1433 (Step S506), and then terminates the process.

Specifically, the cache memory system driver 150 instructs the cache memory system 200 to execute the I/O request via the execution register 210 corresponding to the execution queue 151 in which the I/O request to be processed is registered. The shared storage system driver 160 instructs the shared storage system 300 to execute the I/O request via the execution register 320 corresponding to the execution queue 161 in which the I/O request to be processed is registered.

Figure 14:
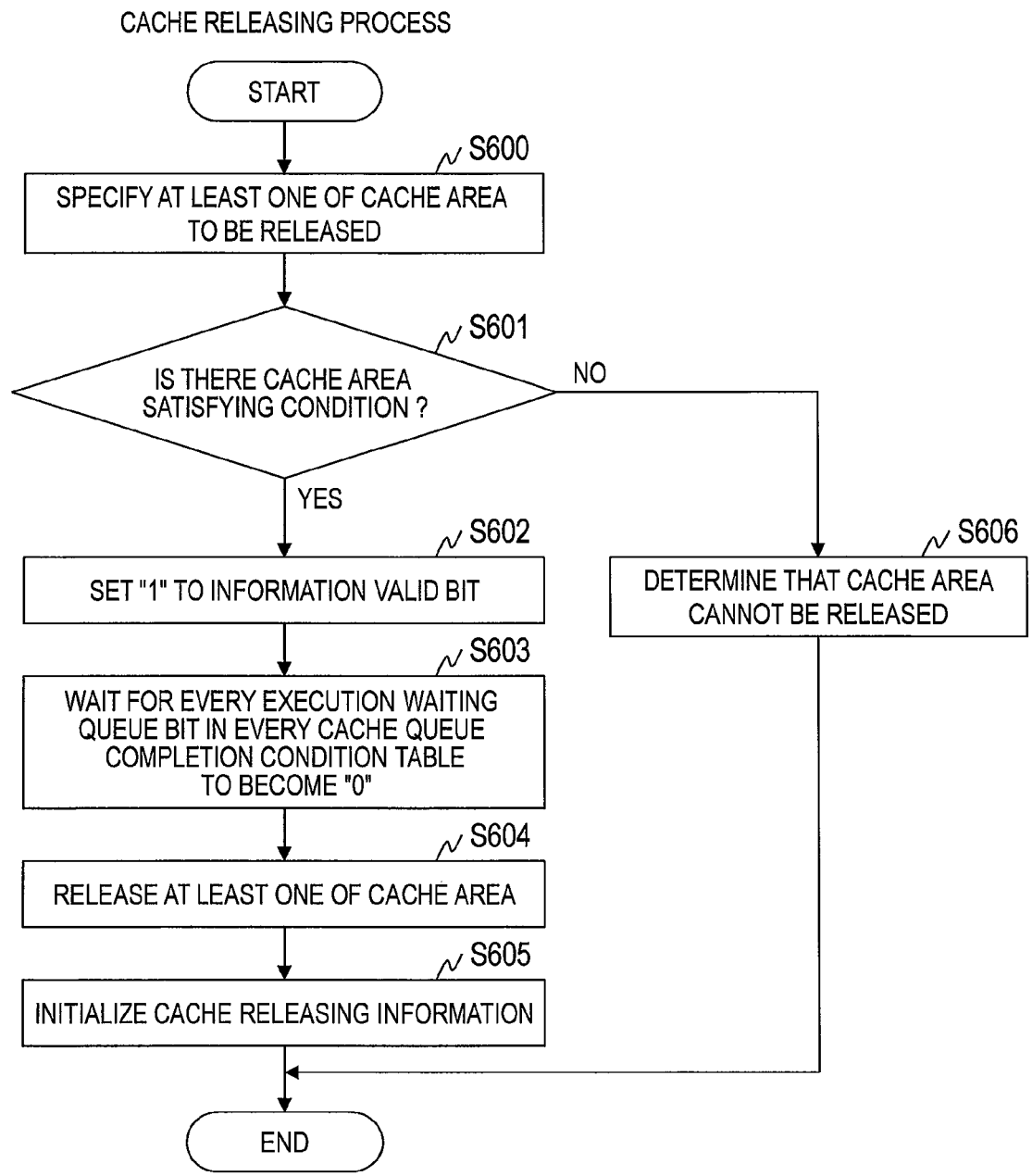
FIG. 14 is a flowchart illustrating an example of a cache releasing process according to the first embodiment of this invention.

FIG. 14 is a flowchart illustrating an example of a cache releasing process according to the first embodiment of this invention.

The cache driver 140 performs the cache releasing process to be described below periodically or in a case where the usage rate of the cache areas of the cache memory system 200 becomes equal to or greater than a predetermined threshold. It should be noted that the cache releasing process may be initiated in a case where execution instruction is received from the OS 130 or the like.

The cache driver 140 determines at least one of the cache area to be released (Step S600).

Specifically, the cache driver 140 retrieves cache releasing information 144 whose information valid bit 14410 is "1". In this example, at least one piece of cache releasing information 144 whose information valid bit 14410 is "1" is retrieved.

The cache driver 140 determines whether there is at least one piece of cache releasing information 144 whose information valid bit 14410 is "1" based on the result of the retrieval (Step S601).

In a case where it is determined that there is no cache releasing information 144 whose information valid bit 14410 is "1", the cache driver 140 determines that the cache area cannot be released (Step S606), and then terminates the processing.

The cache driver 140 monitors the cache queue completion condition table 14420 in each retrieved cache releasing information 144, and waits for all the execution waiting queue bits 14222 of all the entries included in every cache queue completion condition table 14420 to become "0" (Step S603).

In other words, when access to the cache area to be released is prohibited, the cache driver 140 waits for all I/O requests registered in each execution queue 151 to be executed.

As illustrated in Step S504 of FIG. 13, every time an I/O request registered in the execution queue 151 is executed, the execution waiting queue bit 14222 is set to "0". When a given period passes, therefore, all the execution waiting queue bits 14222 become "0". As a result, all the I/O requests for the cache area to be released are executed.

In a case where all the execution waiting queue bits 14222 of all the entries included in every cache queue completion condition table 14420 in arbitrary cache releasing information 144 become "0", the cache driver 140 releases at least one of the cache area corresponding to the address for releasing 14430 of the each retrieved cache releasing information 144 (Step S604).

Specifically, the cache driver 140 retrieves an entry whose cache memory address 1411 matches the address for releasing 14430. The cache driver 140 sets the write valid bit 1414 in the retrieved entry to "1". In other words, the condition of the cache area is changed to the second cache condition from the third cache condition. Thereafter, writing of data into the cache area is enabled.

Assuming that data is written once in the cache area corresponding to an entry whose write valid bit 1414 is "1" when data is written in the cache memory system 200, the destination addresses of a read request and a write request can be separated from each other, and further, the problem of occurrence of garbled data which is caused by skipping of a plurality of I/O requests with respect to the same address can be avoided because the destination addresses of different write requests do not overlap.

The cache driver 140 initializes the cache releasing information 144 in which the execution waiting queue bits 14222 of all the entries included in every cache queue completion condition table 14420 become "0" (Step S605).

Specifically, the cache driver 140 sets the information valid bit 14410 to "0", and empties the address for releasing 14430. In addition, the cache driver 140 deletes the cache queue completion condition table 14420 from the cache releasing information 144.

The cache driver 140 may delete the cache releasing information 144. In the cache releasing process, the cache driver 140 may release all the cache areas that fulfill the condition, or may release only a predetermined number of cache areas. In a case where not all of the cache areas that fulfill the condition are released, the unreleased cache areas are released in the cache releasing process that is to be performed thereafter.

Figure 15:
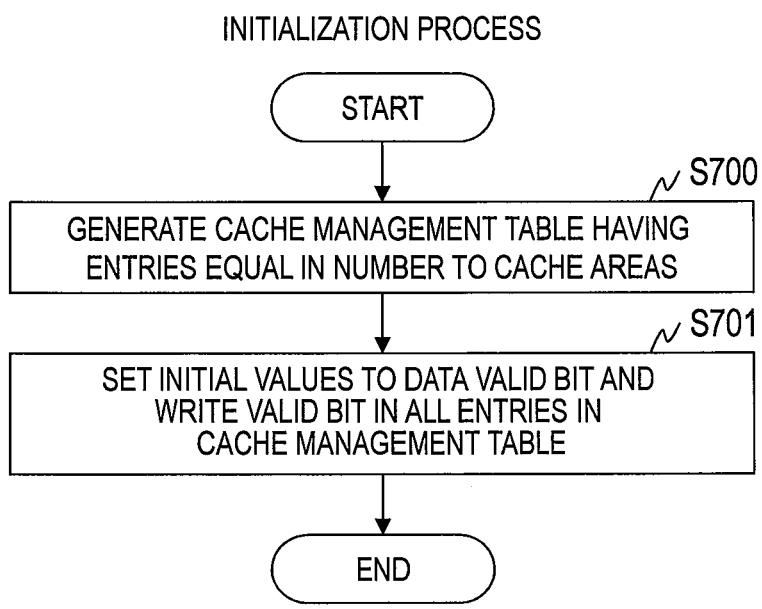
FIG. 15 is a flowchart illustrating an initialization process for the cache management table and the cache releasing information according to the first embodiment of this invention.

FIG. 15 is a flowchart illustrating an initialization process for the cache management table 141 and the cache releasing information 144 according to the first embodiment of this invention.

When the server module 100 is activated initially, the cache driver 140 invoked by the OS 130 performs the initialization process for the cache management table 141 and the cache releasing information 144 which is described below.

The cache driver 140 generates a cache management table 141 having the same number of entries as the number of cache areas generated in the cache memory system 200 to be used as a cache (Step S700).

The cache driver 140 sets initial values to the data valid bits 1413 and the write valid bits 1414 of the individual entries in the generated cache management table 141 (Step S701).

For example, the cache driver 140 sets "0" and "1" to the data valid bits 1413 and the write valid bits 1414 of all the entries, respectively. In other words, the initial conditions of all the cache areas are set to the second cache condition.

As another initialization scheme, in a case where cache preload information defining initial values is set up, the cache driver 140 sets "1" and "0" to the data valid bits 1413 and the write valid bits 1414 of entries corresponding to all the pre-loaded cache areas, respectively. In addition, the cache driver 140 sets "0" and "1" to the data valid bits 1413 and the write valid bits 1414 of the other entries, respectively.

The cache preload information is registered in the cache area at the stage of initial activation, and represents data registered in the cache or the shared storage system address.

Figure 16:
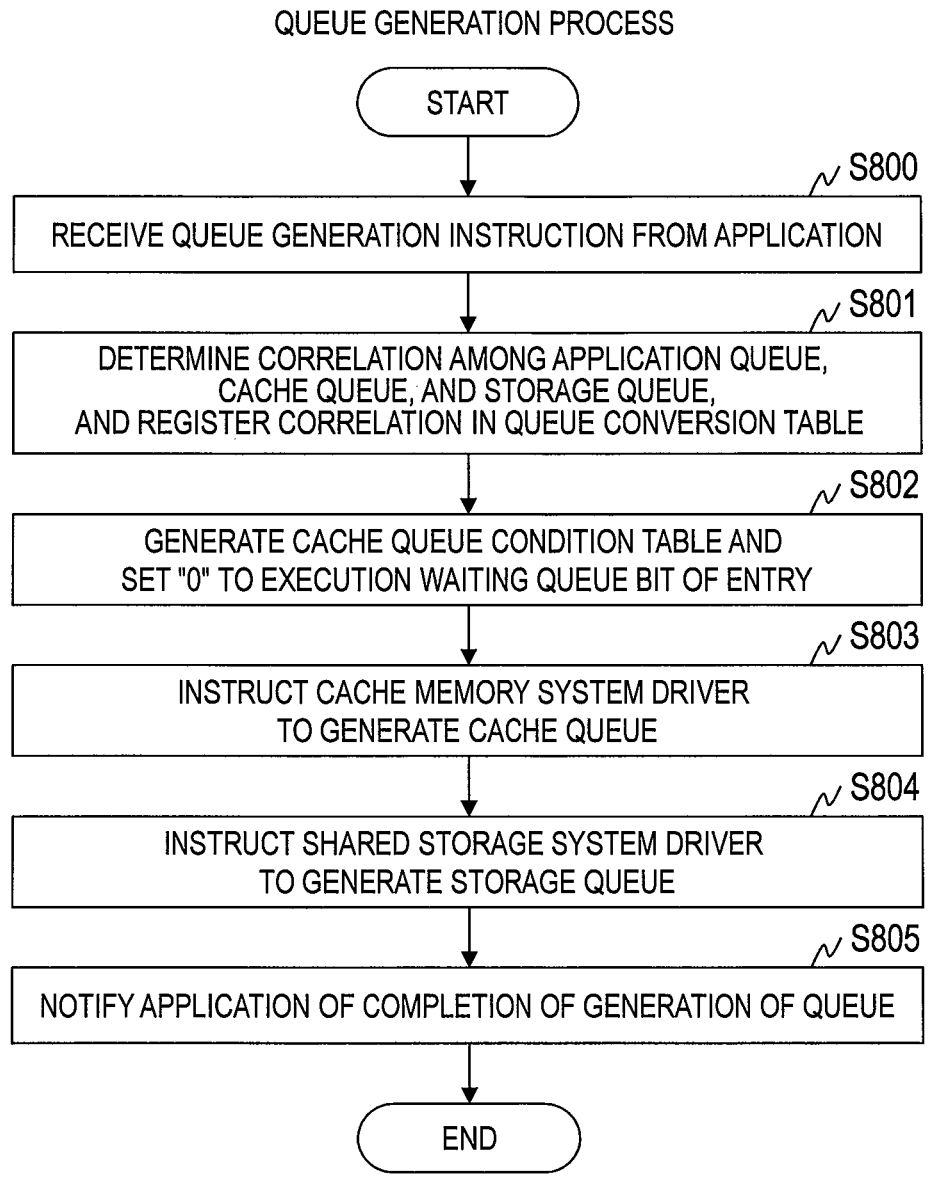
FIG. 16 is a flowchart illustrating a flow of generation of queues by an application according to the first embodiment of this invention.

FIG. 16 is a flowchart illustrating the flow of generation of queues by the application 110 according to the first embodiment of this invention.

In a case of receiving an instruction to generate a queue from the application 110 (Step S800), the cache driver 140 determines the correlation among an application queue number, a cache queue number, and a storage queue number, and registers the correlation in the queue translation table 143 (Step S801).

The cache driver 140 may arbitrarily determine the correlation between the number of a cache queue the cache memory system 200 physically has, and the number of a storage queue the shared storage system 300 physically has. For example, a method in which the correlation is determined based on predetermined policy information is conceivable.

The cache driver 140 generates an entry corresponding to the cache queue number in the cache queue condition table 142, and sets "0" to the execution waiting queue bit 1422 in the generated entry (Step S802).

The cache driver 140 instructs the cache memory system driver 150 to generate a cache queue corresponding to the cache queue number (Step S803). At this time, the cache memory system driver 150 generates the cache queue in response to the instruction, and notifies the cache driver of completion of the generation of the queue.

The cache driver 140 instructs the shared storage system driver 160 to generate a storage queue corresponding to the storage queue number (Step S804). At this time, the shared storage system driver 160 generates the storage queue in response to the instruction, and notifies the cache driver of completion of the generation of the queue.

The cache driver 140 notifies the application 110 of completion of the generation of the queue (Step S805), and then terminates the processing.

As described above, the cache driver 140 according to this invention can prevent the problem of garbled data caused by alteration of the order of execution of I/O requests with respect to the same cache area in the system in which the NVMe-compliant application 110 uses the NVMe-compliant storage system, and uses the NVMe-compliant cache memory as the cache area.

More specifically, when readable data is stored in a cache area as a write target at the time of registering a write request, the cache driver 140 temporarily prohibits access to this cache area (Step S306).

Further, the cache driver 140 changes the destination address for the write request to change the write request registration instruction to an instruction to register a write request in a cache area corresponding to the changed destination address (from Step S400 to Step S403).

With the above-mentioned processing, it is possible to prevent overlapping of the I/O requests with respect to the cache area corresponding to the same address. Therefore, it is possible to prevent occurrence of garbled data.

Further, the cache area where the registration of an I/O request is prohibited is not released immediately, but is released after execution of the I/O request registered at the time the registration of the I/O request has been prohibited is completed. This can overcome mismatch of I/O requests.

This invention achieves similar effects for an application and a cache memory other than the NVMe-compliant application and cache memory.

Modification Example

In the first embodiment, only a cache area where registration of an I/O request is prohibited is the cash releasing target at the time of releasing the cache. However, this invention is not limited to this mode, which may be combined with the related-art cache control algorithm.

The following describes a modification example of the first embodiment of this invention, focusing on the differences from the first embodiment.

The system configuration, the hardware configuration, and the software configuration of the modification example are identical to those of the first embodiment, and hence their descriptions are omitted. Further, the I/O request registration process, the cache registration process, and the I/O process of the modification example are identical to those of the first embodiment, and hence their descriptions are omitted. The initialization process for the cache management table and the cache releasing information, and the queue generation process of the modification example are also identical to those of the first embodiment, and hence their descriptions are omitted.

In the modification example, the cache releasing process partially differs. The following description is given of a least recently used (LRU) cache control algorithm by way of example.

Figure 17:
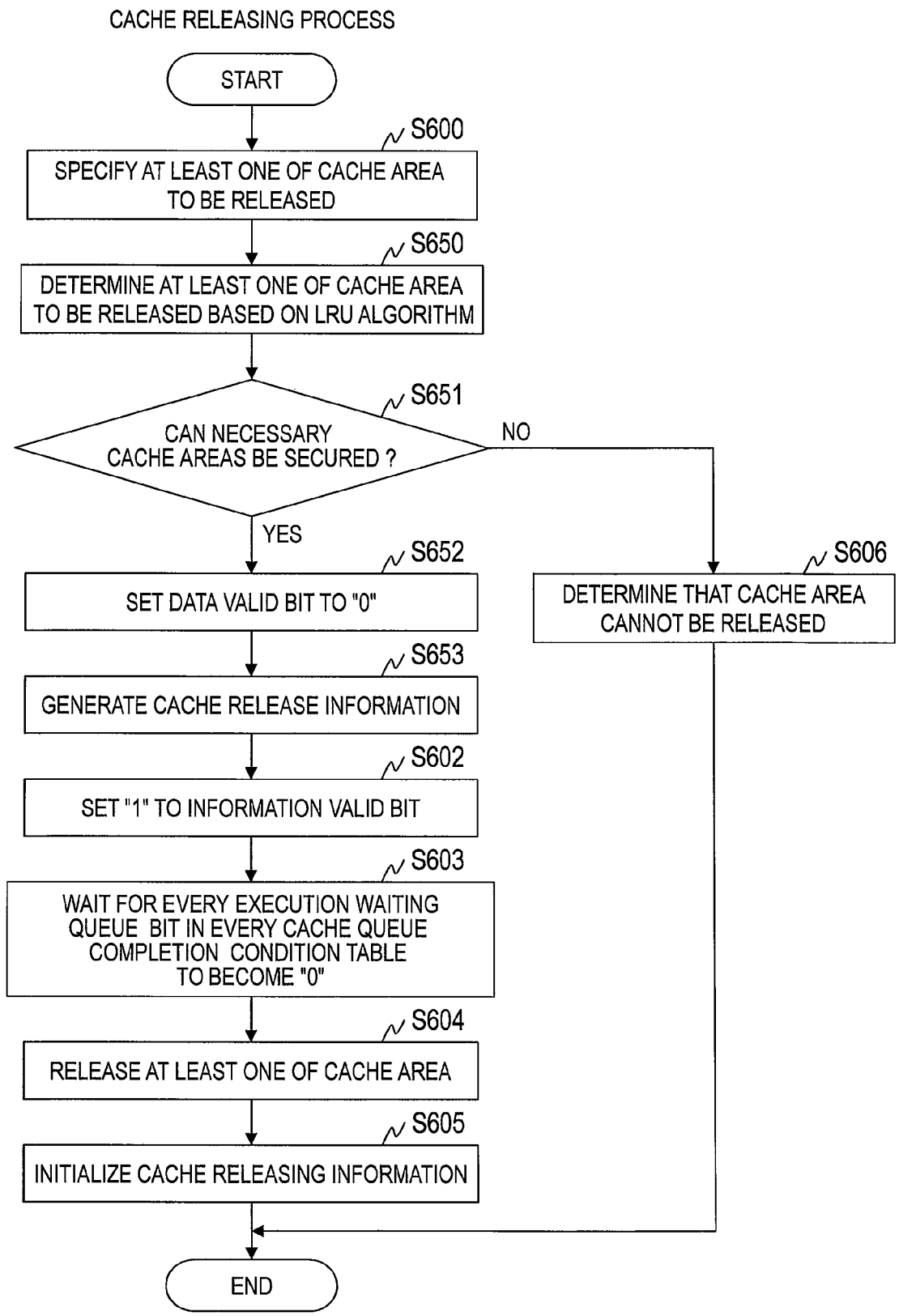
FIG. 17 is a flowchart illustrating an example of the cache releasing process according to a modification example of the first embodiment of this invention.

FIG. 17 is a flowchart illustrating an example of the cache releasing process according to the modification example of the first embodiment of this invention.

After the process of Step S600, the cache driver 140 determines at least one of the cache area to be released based on the LRU algorithm (Step S650). In a case where necessary cache areas cannot be secured merely by the cache areas where registration of an I/O request are prohibited, for example, cache areas to be released are determined using the related-art algorithm.

The cache driver 140 determines whether necessary cache areas can be secured (Step S651). For example, the cache driver 140 determines whether a necessary number of cache areas can be secured based on the sum of the at least one of the cache area specified in Step S600 and the at least one of the cache area determined in Step S651.

In a case of determining that the necessary cache areas can be secured, the cache driver 140 refers to the cache management table 141 to set the data valid bit 1413 of an entry corresponding to each of the cache areas determined in Step S650 to "0" (Step S652). In other words, the condition of each of the cache areas is changed to the third cache condition from the first cache condition. Thereafter, registrations of an I/O request into the cache areas are prohibited.

Further, the cache driver 140 generates the cache releasing information 144 for the cache area determined in Step S650 (Step S653). Specifically, the following process is performed.

First, the cache driver 140 retrieves cache releasing information 144 in which the information valid bit 14410 is "0" and the cache queue completion condition table 14420 is not registered.

In a case where the cache releasing information 144 fulfilling the above-mentioned condition does not exist, the cache driver 140 may determine that the cache area cannot be released, or may newly generate cache releasing information 144.

The cache driver 140 obtains a copy of the current cache queue condition table 142, and registers the copy as the cache queue completion condition table 14420 in the retrieved cache releasing information 144.

Further, the cache driver 140 registers the address of the cache area determined in Step S650 in the address for releasing 14430. In a case where there are a plurality of cache areas determined in Step S650, the addresses thereof are registered as information in a list form in the address for releasing 14430.

The above is the description of the process of Step S653.

In Step S602, the information valid bit 14410 in the cache releasing information 144 generated in Step S653 is also set to "1".

In Step S604, for each address included in the address for releasing 14430, the cache driver 140 sets the write valid bit 1414 of an entry corresponding to this address in the cache management table to "1".

The other processes are the same as those of the first embodiment.

Although the description of each embodiment has been given of the example that adopts software-based control, the control may be partly achieved by hardware.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit.

The above-described configurations and functions may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings shows control lines and information lines as considered necessary for explanation but do not show all control lines or information lines in the products. It can be considered that almost of all components are actually interconnected.

What is claimed is:

1. A computer system, comprising a server on which an application runs, and a storage system that stores data to be used by the application, the server including a first processor, a first memory coupled to the first processor, a cache memory system coupled to the first processor, for providing a plurality of cache areas for temporarily storing data, a connection interface coupled to the first processor, for establishing connection to the cache memory system, and a first network interface coupled to the first processor, for establishing connection to another apparatus, the storage system including a controller including a second processor, a second memory coupled to the second processor, and a second network interface coupled to the second processor, for establishing connection to another apparatus, and a plurality of storage apparatus coupled to the controller, the first memory storing a program for achieving an operating system that controls the server, the second memory storing a program for achieving a storage controller that controls the storage system, the operating system including a cache driver for controlling cache data, a cache memory system driver for controlling an I/O process for the cache memory system, and a storage system driver for controlling an I/O process for the storage system, the cache memory system driver having a plurality of first queues, each of the plurality of first queues registers at least one of I/O request for the cache memory system, the storage system driver having at least one second queue in which at least one of I/O request for the storage system is to be registered, a condition of each of the plurality of cache areas being configured so as to be switchable to any one of a first cache condition in which data is readable from a cache area and writing of data into the cache area is prohibited, a second cache condition in which reading of data from the cache area is prohibited and writing of data into the cache area is permitted, and a third cache condition in which reading of data from the cache area is prohibited and writing of data into the cache area is prohibited, the cache driver being configured to:

determine whether a condition of a first cache area for storing cache data of data to be stored in a first storage area in the storage system is the first cache condition in a case of receiving from the application an instruction to register a first write request to command writing of data into the first storage area; and change the condition of the first cache area to the third cache condition from the first cache condition, in a case of determining that the condition of the first cache area is the first cache condition.

2. The computer system according to claim 1, wherein the cache driver is configured to:

monitor an execution condition of the at least one of I/O request registered in each of the plurality of first queues at a time the condition of the first cache area is changed to the third cache condition from the first cache condition; and release the first cache area by changing the condition of the first cache area to the second cache condition from the third cache condition in a case where all of I/O processes are completed, an I/O process corresponds to the at least one of I/O request registered in the each of the plurality of first queues.

3. The computer system according to claim 2, wherein the cache driver is further configured to:

manage cache management information including an address of the storage area of the storage system, an address of the cache area where cache data of data to be stored in the storage area of the storage system is stored, a first flag indicating whether reading of data from the cache area is permitted, and a second flag indicating whether writing of data into the cache area is permitted, and cache queue condition information including identifiers of the plurality of first queues, and information indicating the execution condition of the at least one of I/O request registered in each of the plurality of first queues;

change the condition of the first cache area to the third cache condition from the first cache condition by operating the first flag;

obtain a copy of the cache queue condition information at a time the condition of the first cache area is changed to the third cache condition from the first cache condition as cache queue completion condition information;

obtain an address of the first cache area;

generate cache releasing information including the cache queue completion condition information and the address of the first cache area;

update an execution condition of an arbitrary one of the plurality of first queues in the cache queue condition information and the cache queue completion condition information in a case where an I/O process for the at least one of I/O request registered in the arbitrary one of the plurality of first queues is completed;

determine whether all of I/O processes are completed based on the cache queue completion condition information, an I/O process corresponds to the at least one of I/O request registered in the each of the plurality of first queues; and change the condition of the first cache area to the second cache condition from the third cache condition by operating the second flag in a case where it is determined that the all of the I/O processes are completed.

4. The computer system according to claim 3, wherein the cache driver is further configured to:
retrieve a second cache area in the second cache condition after the condition of the first cache area is changed to the third cache condition from the first cache condition;
change a condition of the second cache area to the third cache condition from the second cache condition by operating the second flag; and
change the condition of the second cache area to the first cache condition from the third cache condition by operating the first flag in a case where the cache driver is notified of completion of the second write request by the cache memory system driver.

5. The computer system according to claim 2, wherein:
the cache driver is further configured to:
retrieve a second cache area in the second cache condition after the condition of the first cache area is changed to the third cache condition from the first cache condition;
determine a first queue for registering a second write request for commanding writing of data into the second cache area; and
instruct the cache memory system driver to register the second write request together with an identification number of the determined first queue; and
the cache memory system driver is configured to register the second write request in the first queue determined by the cache driver in a case of receiving the instruction to register the second write request.

6. A cache management method for a computer system including a server on which an application runs, and a storage system that stores data to be used by the application,
the server including a first processor, a first memory coupled to the first processor, a cache memory system coupled to the first processor, for providing a plurality of cache areas for temporarily storing data, a connection interface coupled to the first processor, for establishing connection to the cache memory system, and a first network interface coupled to the first processor, for establishing connection to another apparatus,
the storage system including a controller including a second processor, a second memory coupled to the second processor, and a second network interface coupled to the second processor, for establishing connection to another apparatus, and a plurality of storage apparatus coupled to the controller,
the first memory storing a program for achieving an operating system that controls the server,
the second memory storing a program for achieving a storage controller that controls the storage system,
the operating system including a cache driver for controlling cache data, a cache memory system driver for controlling an I/O process for the cache memory system, and a storage system driver for controlling an I/O process for the storage system,
the cache memory system driver having a plurality of first queues, each of the plurality of first queues registers at least one of I/O request for the cache memory system,
the storage system driver having at least one second queue in which at least one of I/O request for the storage system is to be registered,
a condition of each of the plurality of cache areas being configured so as to be switchable to any one of a first cache condition in which data is readable from a cache area and writing of data into the cache area is prohibited, a second cache condition in which reading of data from the cache area is prohibited and writing of data into the cache area is permitted, and a third cache condition in which reading of data from the cache area is prohibited and writing of data into the cache area is prohibited,
the cache management method including:
a first step of determining, by the cache driver, whether a condition of a first cache area for storing cache data of data to be stored in a first storage area in the storage system is the first cache condition in a case of receiving from the application an instruction to register a first write request to command writing of data into the first storage area; and
a second step of changing, by the cache driver, the condition of the first cache area to the third cache condition from the first cache condition, in a case of determining that the condition of the first cache area is the first cache condition.

7. The cache management method according to claim 6, further including:
a third step of monitoring, by the cache driver, an execution condition of the at least one of I/O request registered in each of the plurality of first queues at a time the condition of the first cache area is changed to the third cache condition from the first cache condition; and
a fourth step of releasing, by the cache driver, the first cache area by changing the condition of the first cache area to the second cache condition from the third cache condition in a case where all of I/O processes are completed, an I/O process corresponds to the at least one of I/O request registered in the each of the plurality of first queues.

8. The cache management method according to claim 7, wherein:
the cache driver manages cache management information including an address of the storage area of the storage system, an address of the cache area where cache data of data to be stored in the storage area of the storage system is stored, a first flag indicating whether reading of data from the cache area is permitted, and a second flag indicating whether writing of data into the cache area is permitted, and cache queue condition information including identifiers of the plurality of first queues, and information indicating the execution condition of the at least one of I/O request registered in each of the plurality of first queues;
the second step includes the steps of:
changing the condition of the first cache area to the third cache condition from the first cache condition by operating the first flag;
obtaining a copy of the cache queue condition information at a time the condition of the first cache area is changed to the third cache condition from the first cache condition as cache queue completion condition information;
obtaining an address of the first cache area; and
generating cache releasing information including the cache queue completion condition information and the address of the first cache area;
the third step includes the steps of:
updating an execution condition of an arbitrary one of the plurality of first queues in the cache queue condition information and the cache queue completion condition information in a case where an I/O process for the I/O request registered in the arbitrary one of the plurality of first queues is completed; and
determining whether all of I/O processes are completed based on the cache queue completion condition information, an I/O process corresponds to the at least one of I/O request registered in the each of the plurality of first queues; and the fourth step includes the step of changing the condition of the first cache area to the second cache condition from the third cache condition by operating the second flag in a case where it is determined that all of the I/O processes are completed.

9. The cache management method according to claim 8, further including the steps of:
retrieving, by the cache driver, a second cache area in the second cache condition after the second step;
changing, by the cache driver, a condition of the second cache area to the third cache condition from the second cache condition by operating the second flag; and
changing, by the cache driver, the condition of the second cache area to the first cache condition from the third cache condition by operating the first flag in a case where the cache driver is notified of completion of the second write request by the cache memory system driver.

10. The cache management method according to claim 7, further including the steps of:
retrieving, by the cache driver, a second cache area in the second cache condition after the second step;
determining, by the cache driver, a first queue for registering a second write request for commanding writing of data into the second cache area;
instructing, by the cache driver, the cache memory system driver to register the second write request together with an identification number of the determined first queue; and
registering, by the cache memory system driver, the second write request in the first queue determined by the cache driver in a case of receiving the instruction to register the second write request.

11. A computer on which an application runs, the computer comprising:
a processor;
a memory coupled to the processor;
a cache memory system coupled to the processor;
a connection interface coupled to the processor, for establishing connection to the cache memory system; and
a network interface coupled to the processor, for establishing connection to another apparatus,
the memory storing a program for achieving an operating system that controls the computer,
the cache memory system including a plurality of cache areas for temporarily storing cache data of data to be stored in a storage system to be coupled to the computer,
the operating system including:
a cache driver for controlling the cache data;
a cache memory system driver for controlling an I/O process for the cache memory system; and
a storage system driver for controlling an I/O process for the storage system,
the cache memory system driver having a plurality of queues, each of the plurality of first queues registers at least one of I/O request for the cache memory system,
a condition of each of the plurality of cache areas being configured so as to be switchable to any one of a first cache condition in which data is readable from a cache area and writing of data into the cache area is prohibited, a second cache condition in which reading of data from the cache area is prohibited and writing of data into the cache area is permitted, and a third cache condition in which reading of data from the cache area is prohibited and writing of data into the cache area is prohibited,
the cache driver being configured to:
determine whether a condition of a first cache area for storing cache data of data to be stored in a first storage area in the storage system is the first cache condition in a case of receiving an instruction to register a first write request to command writing of data into the first storage area; and
change the condition of the first cache area to the third cache condition from the first cache condition in a case of determining that the condition of the first cache area is in the first cache condition.

12. The computer according to claim 11, wherein the cache driver is configured to:
monitor an execution condition of the at least one of I/O request registered in each of the plurality of first queues at a time the condition of the first cache area is changed to the third cache condition from the first cache condition; and
release the first cache area by changing the condition of the first cache area to the second cache condition from the third cache condition in a case where all of I/O processes are completed, an I/O process corresponds to the at least one of I/O request registered in the each of the plurality of first queues.

13. The computer according to claim 12, wherein the cache driver is further configured to:
manage cache management information including an address of the storage area of the storage system, an address of the cache area where cache data of data to be stored in the storage area of the storage system is stored, a first flag indicating whether reading of data from the cache area is permitted, and a second flag indicating whether writing of data into the cache area is permitted, and cache queue condition information including identifiers of the plurality of first queues, and information indicating the execution condition of the at least one of I/O request registered in each of the plurality of first queues;
change the condition of the first cache area to the third cache condition from the first cache condition by operating the first flag;
obtain a copy of the cache queue condition information at a time the condition of the first cache area is changed to the third cache condition from the first cache condition as cache queue completion condition information;
obtain an address of the first cache area;
generate cache releasing information including the cache queue completion condition information and the address of the first cache area;
update an execution condition of an arbitrary one of the plurality of first queues in the cache queue condition information and the cache queue completion condition information in a case where an I/O process for the I/O request registered in the arbitrary one of the plurality of first queues is completed;
determine whether all of I/O processes are completed based on the cache queue completion condition information, an I/O process corresponds to the at least one of I/O request registered in the each of the plurality of first queues; and
change the condition of the first cache area to the second cache condition from the third cache condition by operating the second flag in a case where it is determined that all of the I/O processes are completed.

14. The computer according to claim 13, wherein the cache driver is further configured to:
retrieve a second cache area in the second cache condition after the condition of the first cache area is changed to the third cache condition from the first cache condition;

change a condition of the second cache area to the third cache condition from the second cache condition by operating the second flag; and change the condition of the second cache area to the first cache condition from the third cache condition by operating the first flag in a case where the cache driver is notified of completion of the second write request by the cache memory system driver.

15. The computer according to claim 12, wherein:

the cache driver is further configured to:

retrieve a second cache area in the second cache condition after the condition of the first cache area is changed to the third cache condition from the first cache condition;

determine a first queue for registering a second write request for commanding writing of data into the second cache area; and instruct the cache memory system driver to register the second write request together with an identification number of the determined first queue; and the cache memory system driver is configured to register the second write request in the first queue determined by the cache driver in a case of receiving the instruction to register the second write request.

\* \* \* \* \*